(12) United States Patent
Povey

(10) Patent No.: US 9,334,744 B2
(45) Date of Patent: May 10, 2016

(54) VANE ASSEMBLY FOR AN AXIAL FLOW TURBINE

(75) Inventor: Thomas Povey, Oxford (GB)

(73) Assignee: ISIS INNOVATION LTD, Summertown, Oxford (GB)

( * ) Notice: Subject to any disclaimer, the term of this patent is extended or adjusted under 35 U.S.C. 154(b) by 639 days.

(21) Appl. No.: 13/809,037

(22) PCT Filed: Jul. 13, 2011

(86) PCT No.: PCT/GB2011/001053
§ 371 (c)(1),
(2), (4) Date: Mar. 1, 2013

(87) PCT Pub. No.: WO2012/007716
PCT Pub. Date: Jan. 19, 2012

(65) Prior Publication Data
US 2013/0195641 A1  Aug. 1, 2013

(30) Foreign Application Priority Data

Jul. 14, 2010  (GB) .................................. 1011854.5

(51) Int. Cl.
*F01D 9/02* (2006.01)
*F01D 5/14* (2006.01)
*F01D 9/04* (2006.01)

(52) U.S. Cl.
CPC *F01D 9/02* (2013.01); *F01D 5/143* (2013.01); *F01D 5/145* (2013.01); *F01D 9/023* (2013.01);
(Continued)

(58) Field of Classification Search
CPC ........... F01D 9/02; F01D 9/023; F01D 9/041; F01D 5/143; F01D 5/145; F05D 2220/321; F05D 2240/12; F05D 2250/71; F05D 2250/713; Y02T 50/673; Y02T 50/675

USPC ......................................................... 415/191
See application file for complete search history.

(56) References Cited

U.S. PATENT DOCUMENTS 5,829,245 A     11/1998   McQuiggan et al.
5,906,474 A  *   5/1999   Haller et al. ............ F01D 5/141
                                                       415/191
(Continued)

FOREIGN PATENT DOCUMENTS

EP       0 833 060 A2     4/1998
EP       1731712 A1      12/2006
(Continued)

OTHER PUBLICATIONS

Bagshaw, David Andrew (2009) Passage Shaping in Axial Flow Turbines, Durham Theses, Durham University, Available at Durham E-Theses Online: http://etheses.dur.ac.uk/2065/.

(Continued)

*Primary Examiner* — Justin Jonaitis
*Assistant Examiner* — Christopher Brunjes
(74) *Attorney, Agent, or Firm* — Harness, Dickey & Pierce, P.L.C.

(57) ABSTRACT

A vane assembly (21) for an axial flow turbine engine provides a plurality of nozzles (22) arranged symmetrically around a turbine axis formed by an inner hub (26), an outer casing (27) and vanes (23) intermediate pairs of adjacent nozzles. The nozzles have a cross-section normal to the turbine axis that changes smoothly with the position of the cross-section along the turbine axis from a first shape having a minimum radius of curvature of a first value that is no less than a limit L, providing the cross-section with no highly curved corners, to a second shape having a minimum radius of curvature of a second value less than the first value, providing corners. This allows the secondary flow structure to be designed to improve aerodynamic loss and cooling performance.

18 Claims, 14 Drawing Sheets

(52) U.S. Cl.
CPC .......... *F01D 9/041* (2013.01); *F05D 2220/321* (2013.01); *F05D 2240/12* (2013.01); *F05D 2250/71* (2013.01); *F05D 2250/713* (2013.01); *Y02T 50/673* (2013.01); *Y02T 50/675* (2013.01)

(56) References Cited

U.S. PATENT DOCUMENTS

| | | | | |
|---|---|---|---|---|
| 6,079,948 | A * | 6/2000 | Sasaki et al. | F01D 5/141 |
| | | | | 415/191 |
| 6,491,493 | B1 * | 12/2002 | Watanabe et al. | F01D 5/145 |
| | | | | 415/191 |
| 7,082,766 | B1 | 8/2006 | Widener et al. | |
| 7,121,796 | B2 | 10/2006 | Burdgick et al. | |
| 7,255,534 | B2 | 8/2007 | Liang | |
| 7,544,044 | B1 * | 6/2009 | Liang | F01D 5/188 |
| | | | | 416/96 R |
| 2010/0232944 | A1 * | 9/2010 | Hatman | F01D 5/186 |
| | | | | 415/177 |

FOREIGN PATENT DOCUMENTS

| | | |
|---|---|---|
| EP | 1 956 247 A1 | 8/2008 |
| EP | 2236764 A2 | 10/2010 |
| ER | 0 945 594 A1 | 9/1999 |
| GB | 394601 A | 6/1933 |
| GB | 1550932 A | 8/1979 |
| JP | 1998002202 | 1/1998 |
| JP | 1998103002 | 4/1998 |
| JP | 1998196303 | 7/1998 |
| JP | 2002517666 A | 6/2002 |
| JP | 2009036112 A | 2/2009 |
| JP | 05044691 B2 | 10/2012 |
| WO | WO-2005042925 A1 | 5/2005 |
| WO | WO-2010/002294 A1 | 1/2010 |

OTHER PUBLICATIONS

Haller, "Full 3D Turbine Blade Design—Secondary and Tip Clearance Flows in Axial Turbines", VKI LS Jan. 1997.

Eyman et al., "Improving 3D Flow Characteristics in a Multistage LP Turbine by Means of Enwall Contouring and Airfoil Design Modification", ASME Turbo Expo GT-2002-30352 & 30353.

Nagel and Baier, "Experimentally Verified Optimisation of a Three-Dimensional Parametrized Turbine Vane With Nonaxisymmetric End Walls", ASME Journal of Turbomachinery, 2005, vol. 127, p. 380-387.

Denton and Xu, "The Exploitation of Three-Dimensional Flow in Turbomachinery Design", IMechE vol. 213 Part C, 1999, pp. 125-137.

Shih and Lin, "Controlling Secondary-Flow Structure by Leading-Edge Airfoil Fillet and Inlet Swirl to Reduce Aerodynamic Loss and Surface Heat Transfer", Journal of Turbomachinery, 2003, vol. 125, pp. 48-56.

Rosic et al., "Integrated Combustor and Vane Concept in Gas Turbines", ASME Turbo Expo 2010 GT2010, Jun. 14-18, 2010.

Abstract of Bagshaw, "Passage Shaping in Axial Flow Turbines", PHD Thesis, University of Durham, 2008.

\* cited by examiner

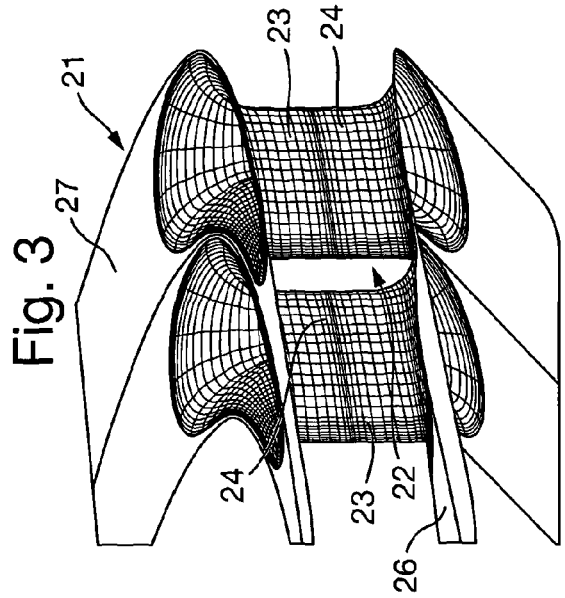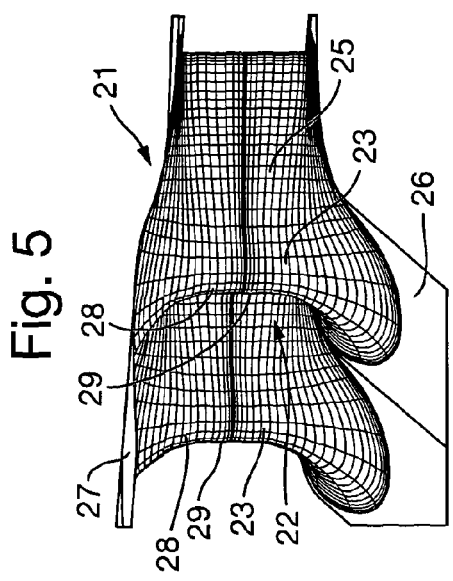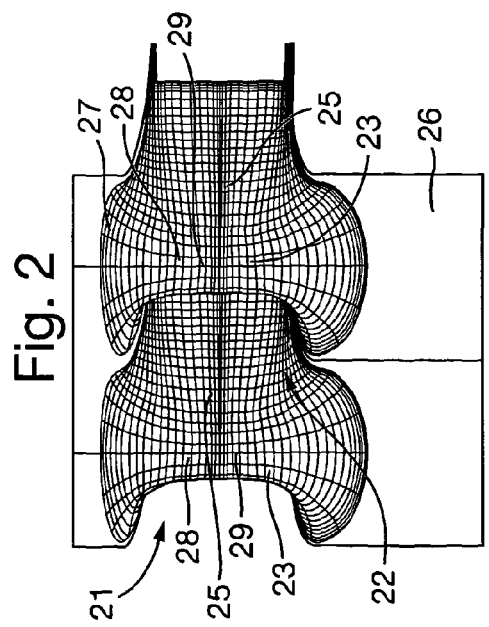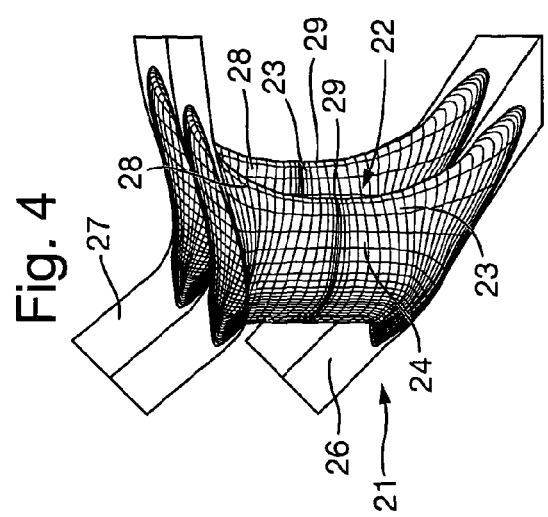

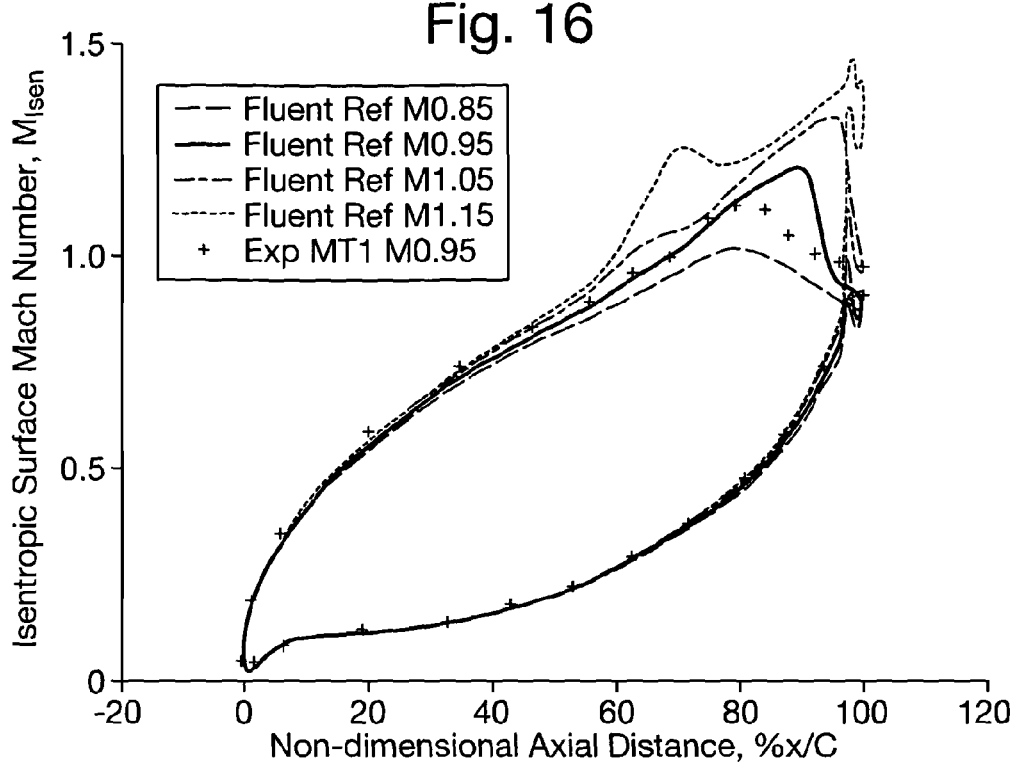
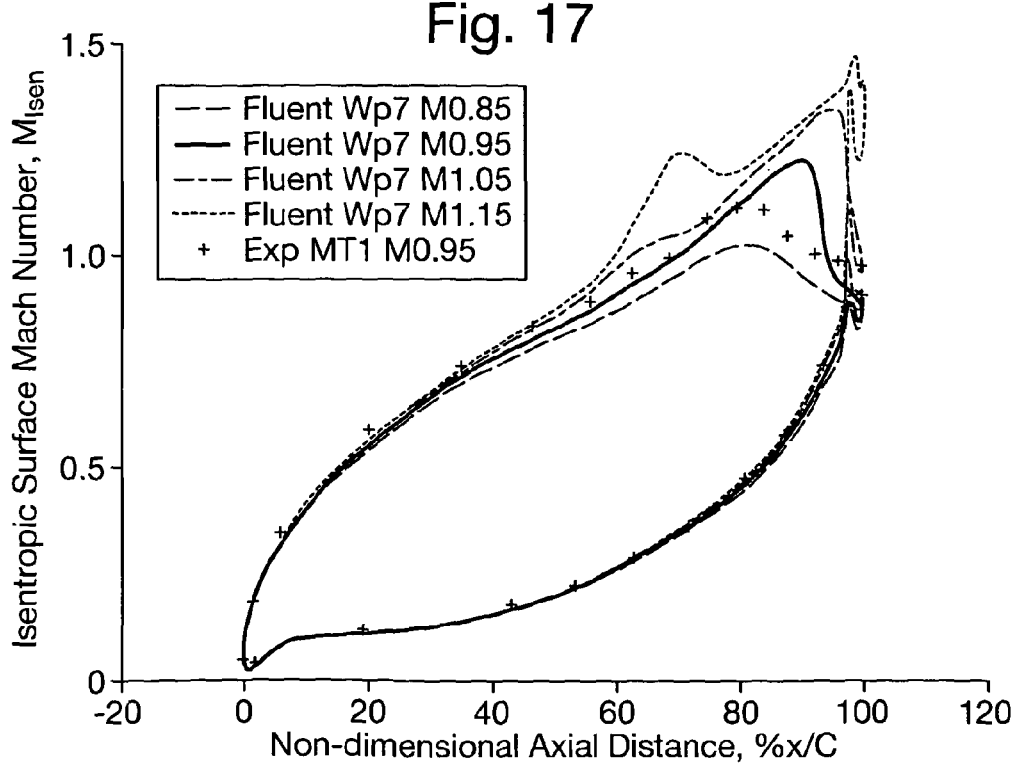

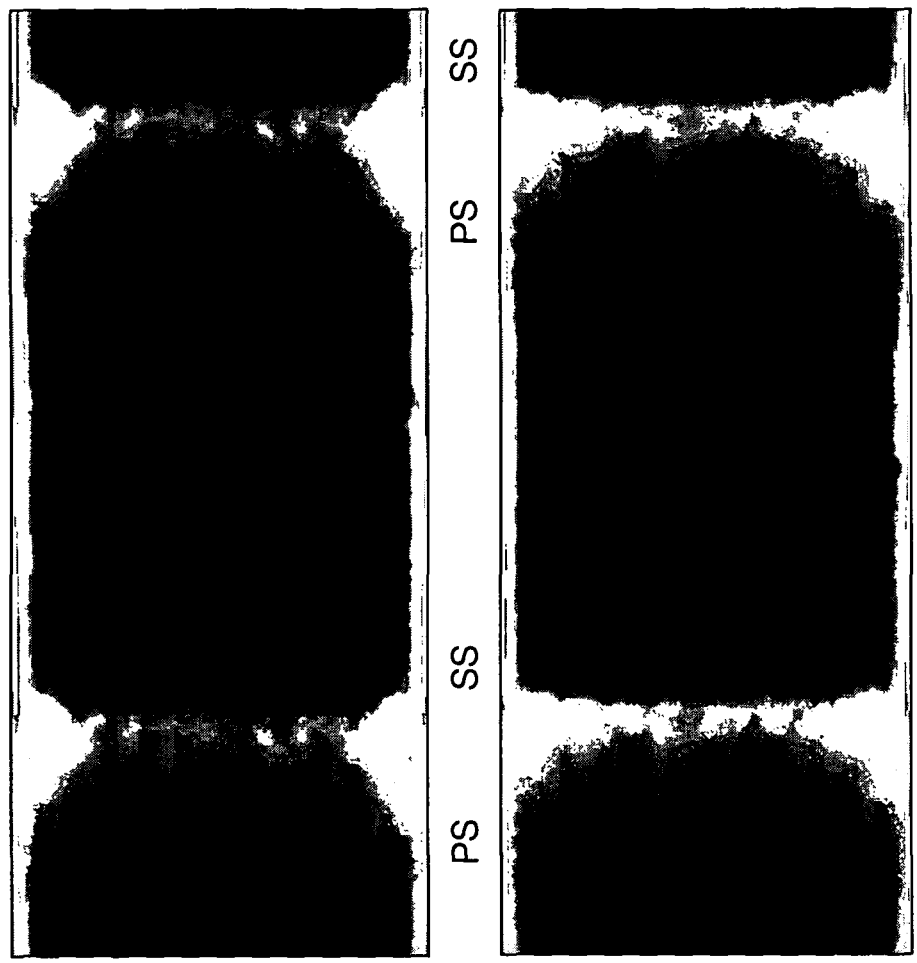
Fig. 18
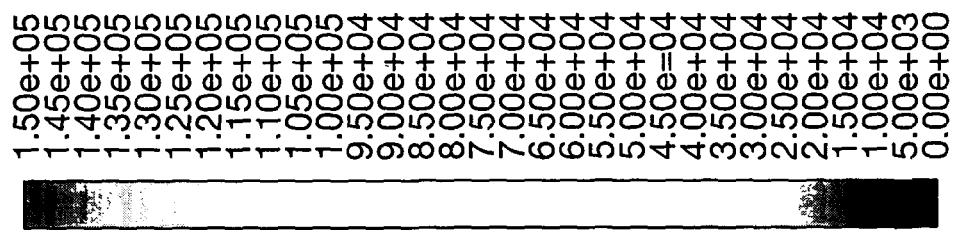

VANE ASSEMBLY FOR AN AXIAL FLOW TURBINE

CROSS-REFERENCE TO RELATED APPLICATIONS

This application is a 371 U.S. National Stage of International Application No. PCT/GB2011/001053, filed on Jul. 13, 2011. This application claims priority to British Patent Application No. 1011854.5, filed on Jul. 14, 2010. The content of the above applications are herein incorporated by reference in their entirety.

The present invention relates to a vane assembly for an axial flow turbine.

An axial flow turbine is a rotary device that generates power within an engine by the expansion of a working fluid from a higher to a lower pressure. In the case of an axial flow gas turbine, the working fluid is a gas, usually air. The turbine forms part of a thermodynamic cycle in which air is compressed, typically in multiple compressor stages, then used to combust fuel which is introduced downstream of the compressor stages, then expanded in a turbine downstream of the combustion stage. Energy to drive the compressor stages is typically provided by the turbine but the thermodynamic cycle provides net energy. The net energy is typically converted to electrical power using an electrical generator, in power-generator applications, or used to drive a jet of high velocity gas to provide thrust, in the case of aero-engine or jet-engine applications. In the case of axial flow steam turbines, the working fluid is steam. Steam is introduced into the turbine at high pressure and temperature and expanded through an axial turbine. The power that is produced by expanding the gas is typically used to drive an electrical generator, as would be the case in power-generator or power-plant applications.

In an axial flow turbine, there is a flow of working fluid is along the turbine axis, often accompanied by a component of flow around the turbine axis, but generally with a high ratio of axial flow to radial flow. An axial flow turbine typically includes alternating rows of stator vane assemblies and rotor vane assemblies. The rotor vane assemblies rotate around the turbine axis and generate power.

Such a vane assembly provides a plurality of nozzles arranged symmetrically around a turbine axis and formed by an inner hub, an outer casing and vanes intermediate each pair of adjacent nozzles. The vanes each provide a suction surface of one of the pair of adjacent nozzles and a pressure surface of the other of the pair of adjacent nozzles. The vane assembly receives an axial flow that is guided through the nozzles which act on the working fluid to turn the working fluid relative to the vane assembly. The flow is referred to as an "axial flow" because it is generally along the turbine axis, but as previously mentioned there may also be a component of flow around the turbine axis, typically being mathematically non-axial by up to 20°. In general terms, the vane assembly may be a stator (sometimes referred to as a nozzle guide vane) that has the purpose of accelerating the working fluid and generating a rotational component in the flow of working fluid or a rotor that has the purpose of generating rotational movement of the rotor from the working fluid. In most rotors there is also an acceleration of the working fluid relative to the rotor. In the rotor power is generated by expansion of the working fluid and the aim is to achieve this as efficiently as possible. Typically, there are plural vane assemblies in successive stages along the turbine axis.

Axial flow turbines are a critical component in several fields including aero-engines and power generation. As such there is an ongoing desire to improve efficiency both to improve performance and to reduce the environmental impact.

In general terms, the design of a vane assembly is approached by designing the annulus lines which describe the shape of the hub and casing contours and the airfoil sections of the vanes which describe the shape of the surfaces that impart turning in the working fluid. The design is performed so that the desired acceleration and turning of the working fluid is achieved. The vane is typically defined by the airfoil stack, which is the solid body formed by extruding between the individual airfoil sections in an approximately radial direction. The vane may have some three-dimensional design in which the airfoils sections vary between inner hub and outer casing. The vane assembly is formed by arranging the individual vanes symmetrically around the annulus.

Such a vane assembly can be represented thermodynamically as an expansion process between one pressure and a lower pressure. The aim is to achieve this expansion with the highest efficiency possible. In practice numerous dissipative processes act to reduce the efficiency. Such dissipative processes result in an increase in entropy, and the entropy change across a vane assembly can be used as a measure of the energy loss. Efficiency is typically defined with respect to a reference expansion in which there are no viscous losses or heat transfer losses. Such a reference expansion process is termed an isentropic expansion process.

Where a stator vane assembly is being considered the actual expansion and the reference expansion are typically between and inlet total pressure and an outlet static pressure. This is because the purpose of the stator vane assembly is to impart a change in static enthalpy. Where a rotor vane assembly is being considered the actual expansion and reference expansion are typically between an inlet total pressure and an outlet total pressure. This is because the purpose of the rotor vane assembly is to cause a change in total enthalpy of the flow, such enthalpy being removed as rotor power. In a stator vane assembly, an increase in entropy results in a decrease in static enthalpy change. In the rotor vane assembly, an increase in entropy results in a decrease in total enthalpy change in the working fluid, and hence also a decrease in the work output and the isentropic efficiency.

One mechanism which leads to an increase in entropy in stator vane assemblies and rotor vane assemblies is the action of viscous forces in the working fluid near the hub and casing and vane walls. These viscous forces cause an increase in entropy and a loss in total pressure of the working fluid. Working fluid with relatively low total pressure is caused by the pressure gradients established by the vanes to be turned relative to higher total pressure fluid, causing secondary flows which have a vorticity component whose vector is aligned with the main flow direction. These secondary flows cause additional viscous dissipation both within the stator or rotor vane assembly, but also in downstream vane assemblies as the vorticity in the working fluid is dissipated through viscous action. The secondary flows also cause non-uniformity in the flow at outlet of the vane assembly or rotor vane assembly. In general, for successive stages to function with optimum efficiency each stage should produce as uniform a field of flow at its outlet as possible.

Secondary flows can be seen as reducing the efficiency of successive stages. For example, Haller, "Full 3D Turbine Blade Design—Secondary and Tip Clearance Flows in Axial Turbines", VKI LS 1997-01 suggests that stator secondary flows account for 14% of losses in a typical HP (high pressure) stator-rotor stage. Whilst profile losses form the most significant contribution, secondary losses have the possibility of being reduced as has been demonstrated in research papers referenced below.

Numerous researchers have considered the magnitude of the secondary flow structures and much work has gone into reducing secondary losses within stator vane assemblies and rotor vane assemblies. Broadly speaking, research has focussed on altering the aerofoil shape of the vane or the profile of the inner hub and outer casing that form the end walls of the nozzles. Some papers such as Bagshaw, "Passage Shaping in Axial Flow Turbines", PHD Thesis, University of Durham, 2008 and Eyman et al., "Improving 3D Flow Characteristics in a Multistage LP Turbine by Means of Enwall Contouring and Airfoil Design Modification", ASME Turbo Expo GT-2002-30352 & 30353 have investigated combinations of the two and Nagel and Baier, "Experimentally Verified Optimisation of a Three-Dimensional Parametrized Turbine Vane With Nonaxisymmetric End Walls", ASME Journal of Turbomachinery, 2005, Vol 127, pg. 380-387 discuss an attempt to optimise the vane profile in tandem with the end-wall contouring. The various approaches attempted by these authors and others may be summarised as follows.

One approach is to consider aerofoil lean. Near the airfoil surface changes in the surface curvatures can cause pressure gradient components to be established in the working fluid normal to the surface of the wall and consequently the angle of the blade can be used to control pressure gradients within the channel. Compound lean refers to bowing of the vane away from the radial direction such that the mid-span section is displaced and the lower and upper ends meet the end-walls at an angle different from 90°. Reverse compound lean, where the suction side forms an acute angle with the end-wall, is discussed extensively in Bagshaw 2008 (full reference above). The result of the bowing is to induce span-wise pressure gradients towards each end-wall on the suction side that act to suppress the radial extent of the secondary flows found there. This generated beneficial effects including more uniform flow at exit, reduced end-wall losses and a reduction in exit angle variation. Bagshaw 2008 (full reference above) concludes that the displacement of the midspan, rather than the end-wall angle, was the predominant factor governing effectiveness.

Another approach is to consider modifications to the leading edge of the vanes. Leading edge extension is discussed extensively in Denton and Xu, "The Exploitation of Three-Dimensional Flow in Turbomachinery Design", IMechE Vol 213 Part C, 1999, pp. 125-137. Here, the chord is extended in the end-wall regions, off-loading the front of the blade near the end-walls. Shih and Lin, "Controlling Secondary-Flow Structure by Leading-Edge Airfoil Fillet and Inlet Swirl to Reduce Aerodynamic Loss and Surface Heat Transfer", Journal of Turbomachinery, 2003, Vol. 125, pp. 48-56 discloses an extension to the concept by adding material at the leading-edge end-wall intersection to create fillets and bulbs. The height of all the features is approximately equal to that of the boundary layer. The intension of fillets is to reduce the magnitude of the horseshoe vortex by accelerating the lower boundary layer fluid. This decreases the radial pressure gradient in the boundary layer reducing flow reversal. The intention of bulb geometry is to actually enhance the pressure side horseshoe vortex which then interferes with the passage vortex, reducing its magnitude. Shih and Lin 2003 (full reference above) discloses that such features could significantly reduce loss.

Yet another approach is to modify the profile of the end-wall of the nozzles formed by the inner hub or outer casing. Modified end-wall topology has the goal of decreasing the cross passage pressure gradient in the end-wall boundary layer region. Historically axisymmetric end-walls were used in axial flow turbines. More recently complex non-axisymmetric designs such as those disclosed in Bagshaw 2008 (full reference above) have been tested. Non-axisymmetric profiling can be used to reduce the cross passage pressure gradient near the endwall. This is done by adding material to the pressure side (a convex bump) which increases the local flow velocity and reduces the static pressure and removing material from the suction side (a concave depression) with the opposite effect.

Whilst these approaches may allow improvements, secondary flow control and reduction is an emerging field of research, and it remains desirable to develop further design concepts that allow secondary flows to be controlled and reduced in stator vane assemblies and rotor vane assemblies.

According to the present invention, there is provided a vane assembly for an axial flow turbine, the vane assembly providing a plurality of nozzles arranged symmetrically around a turbine axis formed by an inner hub, an outer casing and vanes intermediate each pair of adjacent nozzles, the vanes each providing a suction surface of one of the pair of adjacent nozzles and a pressure surface of the other of the pair of adjacent nozzles, at least some of the nozzles having a cross-section normal to the turbine axis that changes smoothly with the position of the cross-section along the turbine axis from a first shape having a minimum radius of curvature of a first value that is no less than a limit L to a second shape having a minimum radius of curvature of a second value less than the first value, where defining a reference plane normal to the turbine axis at a position where a circle in the reference plane centred on the turbine axis and touching the trailing edge of a vane minimises the position along the turbine axis in the direction of axial flow, defining a reference radius from the turbine axis that is the average of (a) the minimum radius from the turbine axis of the nozzle at the inner hub in the reference plane and (b) the maximum radius from the turbine axis of the nozzle at the outer casing in the reference plane, defining a reference cross-section of a nozzle normal to the turbine axis at a position along the turbine axis where an axial line parallel to the turbine axis at the reference radius from the turbine axis is tangential to the suction surface of a vane, defining a characteristic length a as half the difference between (c) the minimum radius from the turbine axis of the nozzle at the inner hub in the reference cross-section and (d) the maximum radius from the turbine axis of the nozzle at the outer casing in the reference cross-section, and defining a characteristic length b as the area of the reference cross-section divided by the product ($\pi$.a), the limit L is defined as k.min(a,b), where k is a constant of at least ⅓. Such a vane assembly has a cross-section normal to the turbine axis that changes smoothly with the position of the cross-section along the turbine axis. Moreover, the cross-section of the nozzles are designed to change from a first shape having a minimum radius of curvature of a first value that is no less than a limit L to a second shape having a minimum radius of curvature of a second value less than the first value. The limit L is defined in terms of characteristic lengths a and b of the nozzles.

The requirement on the minimum radius of curvature of the first shape of the cross-section of the nozzle means that no part of the first shape of the cross-section has a highly curved corner with a radius of curvature less than the limit L, so the first shape is gently curved around its entirety. Conversely, the requirement on the minimum radius of curvature of the second shape of the cross-section of the nozzle means that the shape has highly curved corners with a radius of curvature less than the first value of the minimum radius of curvature of the first shape that is itself no less than the limit L. For example, the second shape might have four sides having a minimum radius of curvature of a value greater than the first value with corners between the four sides having a radius of curvature of a value less than the first value. Typically, the minimum radius of curvature of the second shape of the cross-section of the nozzle is significantly greater than the first value.

This means that the shape of the cross-section of the nozzle normal to the turbine axis changes from the gently curved first shape to the sharply cornered second shape. For example, the first shape may be one of: an ellipse; an oval; a racetrack shape having two straight sides between curved ends; or a curved shape having at least one inwardly curving section, and the second shape may be one of: a sector; a filleted sector; a leant sector; a filleted leant sector; a compound leant sector; or a filleted compound leant sector.

As such, the present invention may be viewed as designing the nozzles of the vane assembly to have a particular shape that is inherently three-dimensional in nature, that is including a change in the design of the cross-section along the direction of flow. This may be contrasted with many prior art vane assemblies that have a two-dimensional shape normal to the turbine axis that is predominantly a sector with generally straight sides formed by the vanes extending radially from the axis and gently curved sides formed by the hub and casing extending around the axis, perhaps with modifications such as aerofoil lean, modifications to the leading edge including extensions, filleting of the corners, or profiling of the end walls.

The present invention has a number of advantages as follows.

The main advantage is that the secondary flow structure of the vane assembly of the present invention is very different from that of prior art designs including a nozzle of two-dimensional shape that is predominantly a sector. This makes it possible to optimise the secondary flows to improve the aerodynamic loss and cooling performance. This allows improvements in efficiency as discussed in more detail below.

Other advantages related to the shape are as follows. The component shape is very different from that of prior art designs including a nozzle of two-dimensional shape that is predominantly a sector. In particular the shape has the ability to reduce stress concentrations and improves the ability to cool the vanes, either internally or by film-cooling.

The shape also opens up the possibility of improvements in manufacturing by being better suited to techniques of relatively low cost. For example, the rounded nature of the upstream hub and casing entries to the nozzles may provide benefits in some manufacturing techniques such as stamping and casting. This in turn might allow reduction of cost and/or allow optimised internal cooling and/or film-cooling systems to be employed in certain applications where stamping or casting are possible.

The shape may also allow the overall heat load to the vane to be reduced by reducing the surface area (for a given mass flow and turning angle) or by controlling the heat transfer coefficients through boundary layer and secondary flow control.

To allow better understanding, an embodiment of the present invention will now be described by way of non-limitative example with reference to the accompanying drawings, in which:

FIGS. 2 to 5 are views from the front, rear, suction side and pressure side, respectively, of part of a vane assembly including a nozzle

FIGS. 16 and 17 are graphs of nozzle mid-span isentropic surface Mach number distributions (various mean exit Mach numbers) compared with experimental data at a single Mach number for the nozzles of FIGS. 14 and 15, respectively;

FIG. 18 is a plot of contours of vorticity magnitude for a 10% axial chord downstream of the nozzle trailing edge for the nozzles of FIGS. 12 and 13;

The shape of vane assemblies for an axial flow turbine engine in accordance with embodiments of the present invention will first be described.

Figure 1:
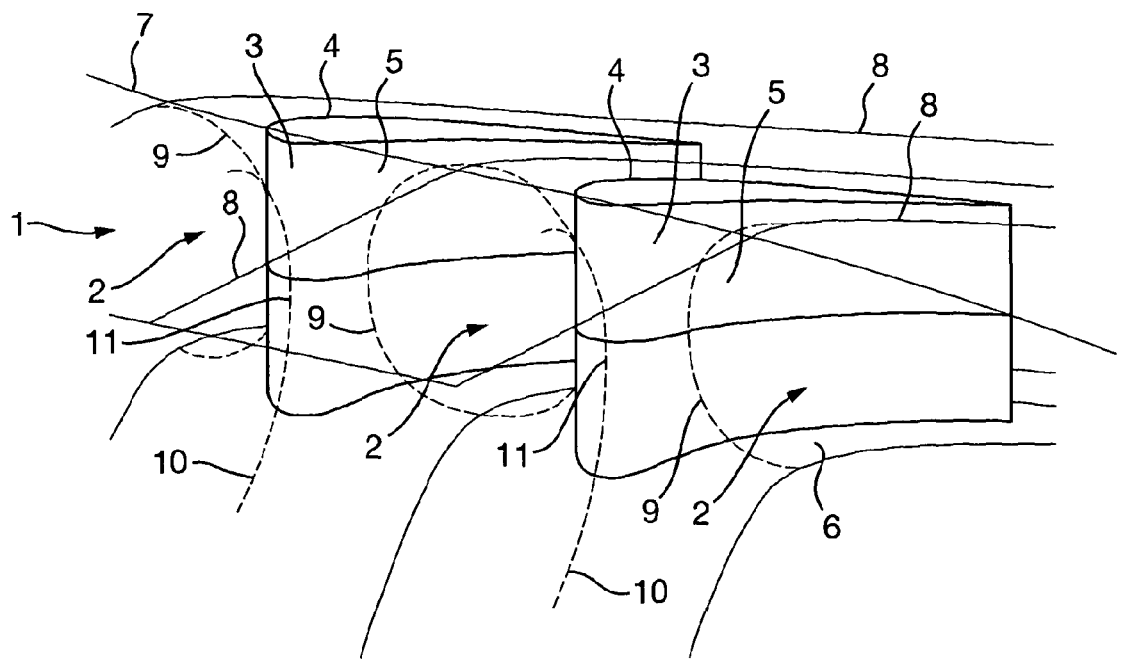
FIG. 1 is a perspective front view of part of a vane assembly with nozzles that are sector-shaped schematically overlaid with shapes illustrating a modified construction.

To illustrate the nature of the shape, FIG. 1 illustrates the modifications to a known vane assembly 1 providing a plurality of nozzles 2 extending around a turbine axis and arranged to partition a flow from an annular duct. For simplicity, FIG. 1 is a view of part of the vane assembly 1 showing only three of the identical nozzles 2 that are arranged symmetrically around the turbine axis. The nozzles 2 have a cross-section that is predominantly a sector, but in FIG. 1 the vane assembly 1 is shown unwrapped from the turbine axis so that they appear rectangular. Nonetheless, the actual sector shape is approximately rectangular in any event, in view of the number of vanes 3 around the turbine axis. The corners of the sector shape may be filleted to increase their radius of curvature slightly.

The nozzles 2 are formed between vanes 3 intermediate each pair of adjacent nozzles 2. The vanes 3 are each shaped as aerofoils to provide a suction surface 4 and a pressure surface 5 of adjacent nozzles 2. The vanes 3 extend between an inner hub 6 and an outer casing that is omitted for clarity but the location of which is indicated by a circumferential line 7 and axial lines 8. As a result, the nozzles 2 are formed with a cross-section that is shaped as a sector having straight sides extending radially from the turbine axis formed by the vanes 3 and gently curved sides that are a section of a circle around the turbine axis formed by the inner hub 6 and the outer casing.

The known vane assembly 1 is modified as shown in FIG. 1 to form an embodiment of the present invention.

Firstly, the shape of the cross-section of a nozzle 2 normal to the turbine axis at the upstream end is modified to decrease the curvature, that is increase the radius of curvature, of the sharp corners of the cross-section so that it has a first shape as shown by the dashed line 9. However, the shape of the cross-section of a nozzle 2 normal to the turbine axis at the downstream end of the nozzle is not changed and remains with a second shape that is predominantly a sector. In between, the nozzle 2 is shaped to blend the first shape into the second shape, so that the cross-section normal to the turbine axis changes smoothly with the position of the cross-section along the turbine axis.

Secondly, the leading face of the vanes 3 intermediate two nozzles 2 facing upstream into the annular duct is modified to decrease the curvature, that is increase the radius of curvature, of the sharp corners between the vanes 3 and the inner hub 6 and between the vanes 3 and outer casing, so that it has a shape as shown by the dashed line 10. As a result, the leading face of the vanes 3 is shaped as a saddle having a saddle point 11 intermediate the inner hub 6 and the outer casing. The vane is shaped to blend the saddle shape of its leading face into the first shape of the cross-section of the nozzle 2.

As a result of these modifications, there is provided a vane assembly 21 as shown from different angles in FIGS. 2 to 5.

The vane assembly 21 provides a plurality of nozzles 22 formed between vanes 23 intermediate each pair of adjacent nozzles 22 and extending entirely around a turbine axis, although for simplicity FIGS. 2 to 5 show only two of the identical vanes 23 that are arranged symmetrically around the turbine axis. As in FIG. 1, in FIGS. 2 to 5 the vane assembly 1 is shown unwrapped from the turbine axis so that the sector shapes around the turbine axis appear rectangular.

The vanes 23 are each shaped as aerofoils to provide a suction surface 24 of one of the pair of adjacent nozzles 22 and a pressure surface 25 of the other of the pair of adjacent nozzles 22. The vanes 23 extend between an inner hub 26 and an outer casing 27. The vanes 23, inner hub 26 and outer casing 27 are formed to shape the nozzles 22 as follows.

The cross-section of a nozzle 22 normal to the turbine axis at the upstream end of the nozzle 22 has a first shape that is gently curved around its entirety so that there are no sharp corners. In particular, the first shape has a minimum radius of curvature of a first value that is no less than a limit L that is defined with respect to characteristic lengths of the nozzle 2 as described further below. Thus, at the upstream end of the nozzle 22, the vanes 23 blend into the inner hub 25 and outer casing 27. Thus, it is more helpful to consider the overall shape of the nozzle 22 itself, rather than respective shapes of the separate components of vanes 23, inner hub 26 and outer casing 27.

The cross-section of a nozzle 22 normal to the turbine axis at the downstream end of the nozzle 22 has a second shape that does have sharp corners. Thus the second shape has a minimum radius of curvature of a second value less than the first value, typically by an order of magnitude. In particular, the second shape may have four sides formed by the inner hub 26, the outer casing 27 and two vanes 23. The sides are generally flat, having a minimum radius of curvature of a value greater than the first value, in particular the two sides formed by the vanes 23 being generally straight and extending radially from the turbine axis and the two sides formed by the inner hub 26 and outer casing 27 being a section of a circle around the turbine axis that is gently curved. The corners between the four sides have a radius of curvature of a value less than the first value, typically by an order of magnitude. The corners may be filleted so that they have some degree of curvature, but still with a shorter radius of curvature than the first value of the first shape.

In between the upstream and downstream ends, the nozzle 22 is shaped to blend the cross-section of the first shape into the cross-section of the second shape. As a result, the cross-section normal to the turbine axis changes smoothly with the position of the cross-section along the turbine axis. The change is sufficiently smooth as to optimise, or not to disrupt, the flow of the working fluid along the nozzle 2. For example, in some embodiments the change is sufficiently smooth as not to provide a discontinuity in the second derivative of the cross-sectional area normal to the turbine axis with position along the turbine axis and/or in some embodiments the change is sufficiently smooth as not to provide a discontinuity in tangents to the surface of the nozzle 2 along the direction of flow.

Typically, the cross-section normal to the turbine axis may change from said first shape to said second shape with a minimum radius of curvature that decreases monotonically, that is the minimum radius of curvature is always the same or shorter at increasing position along the turbine axis. That being said, in principle there could be some partial ranges of position along the turbine axis where the minimum radius of curvature increases, provided that the overall change is from the first shape to the second shape.

Figure 6:
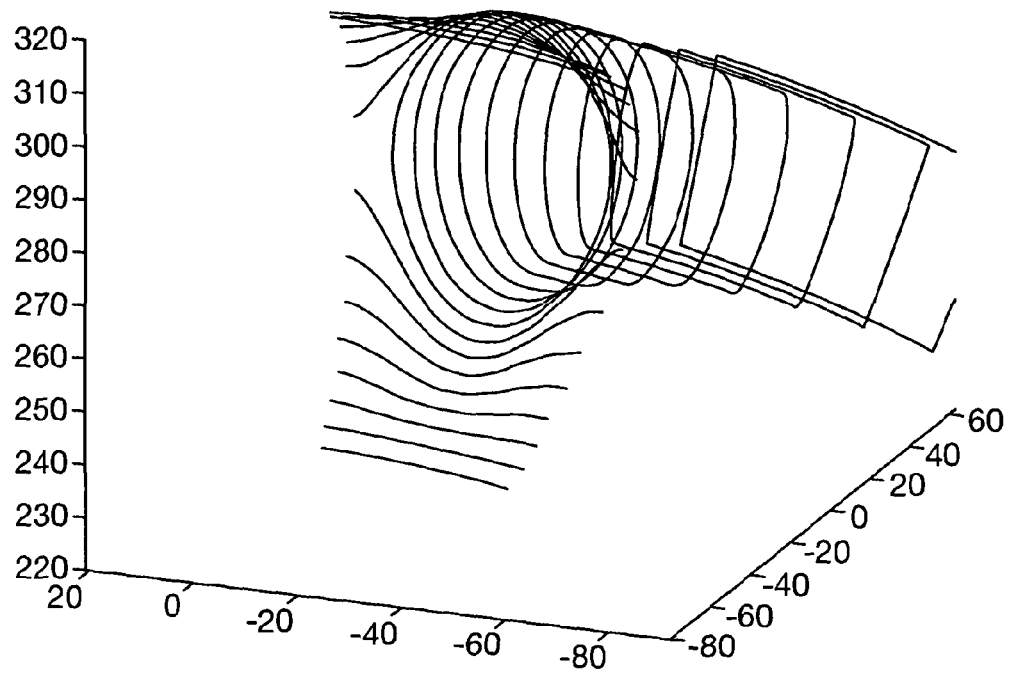
FIGS. 6 and 7 are diagrams from two different angles of contours of the same nozzle in planes of constant position along the turbine axis.
Figure 7:
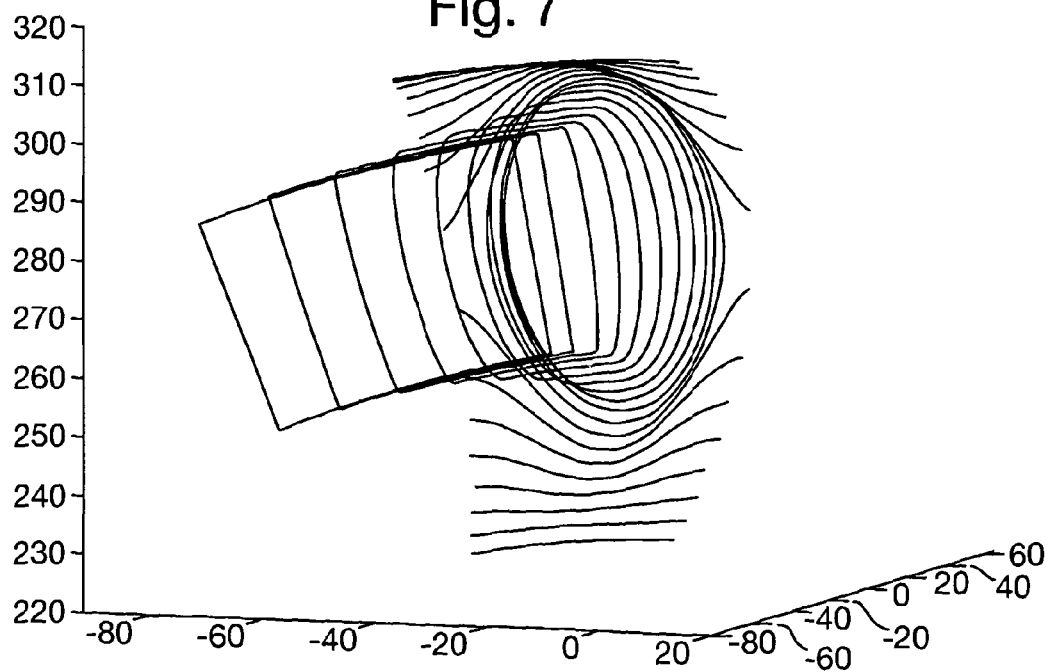

FIGS. 6 and 7 illustrate the change in shape of the nozzle 22 along the turbine axis by showing contours in planes of constant position along the turbine axis for the case that the first shape is an ellipse and the second shape is a sector.

Figure 9:
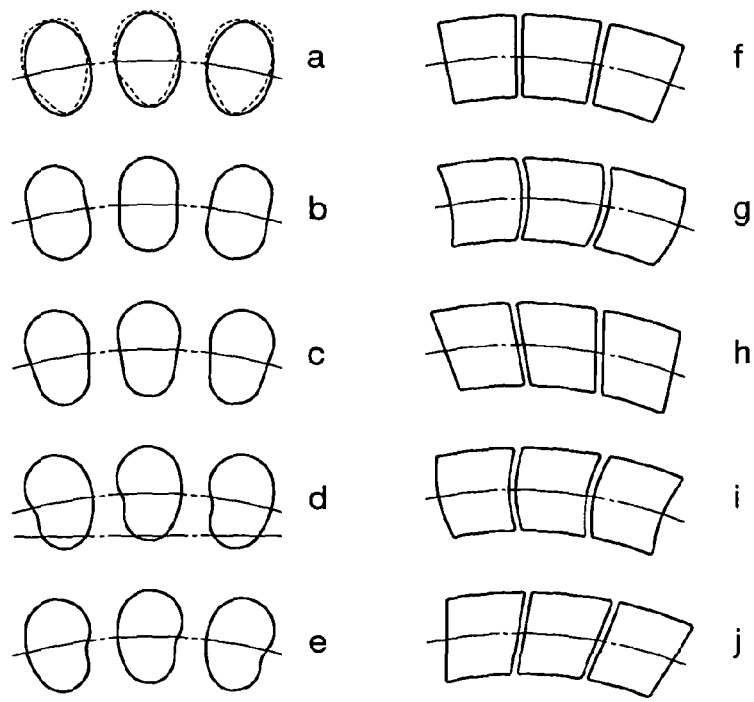
FIGS. 9a to 9e are a series of diagrams of possible first shapes within a nozzle and FIGS. 9f to 9j are a series of diagrams of possible second shapes within a nozzle.

As described above, the first shape has a minimum radius of curvature of a first value that is no less than a limit L, which means the first shape is gently curved around its entirety. Within this constraint, the first shape may take any curved shape. Some non-limitative examples of possible shapes are shown in FIG. 9 as follows:

an ellipse (e.g. continuous line in FIG. 9a);

an oval (e.g. dotted line in FIG. 9a);

a racetrack shape having two straight sides between curved ends (e.g. FIGS. 9b and 9c); or a curved shape having at least one inwardly curving section, including a kidney shape with one inwardly curving section (e.g. FIGS. 9d and 9e).

Similarly the second shape has a minimum radius of curvature of a second value that is less than the first value, which means the first shape has sharp corners. Within this constraint, the first shape may take any shape. Some non-limitative examples of possible shapes are shown in FIG. 9 as follows:

a sector (e.g. FIG. 9f);

a leant sector (e.g. FIGS. 9h and 9j);

a compound leant sector (e.g. FIGS. 9g and 9i); or
any of those shapes with filleted corners.

The leading face 28 of the vanes 23 intermediate two nozzles 22 facing upstream into the annular duct has a shape that is gently curved from the inner hub 26 to the outer casing 27 so that there are no sharp corners between the vane 23 and the inner hub 26 or between the vane 23 and the outer casing 27. As a result, the leading face 28 of the vane 23 is shaped as a saddle having a saddle point 29 intermediate the inner hub 26 and the outer casing 27. In particular, the leading face 28 of a vane 23 along a line in a plane extending radially of the turbine axis and through the saddle point, within a range of positions along the turbine axis from the saddle point 29 of a characteristic length b, is curved with a minimum radius of curvature that has a third value that is no less than the limit L. The characteristic length b of the nozzle 2, together with the definition of the limit L, is described further below.

The vane 23 is shaped to blend the saddle shape of its leading face 28 into the first shape of the cross-section of the nozzle 22. As a result, the overall cross-section of the annular duct normal to the turbine axis, bounded by the inner hub 26, the outer casing and the leading faces of the vanes 23, varies smoothly with the position along the turbine axis, within the range of positions along the turbine axis from the saddle point 29 of the characteristic length b. At the position of the saddle point 29 where the annular duct is divided into the nozzles 22, the overall cross-section of the annular duct normal to the turbine axis varies smoothly into the cross-sections of the nozzles 22 of the first shape. Thus, the nozzles 22 have the cross-section normal to the turbine axis of the first shape at the position along the turbine axis of the saddle point 29. The change is sufficiently smooth as to optimise, or not to disrupt, the flow of working fluid into the nozzle 22. For example, in some embodiments the change is sufficiently smooth as not to provide a discontinuity in the second derivative of the cross-sectional area normal to the turbine axis with position along the turbine axis and/or in some embodiments the change is sufficiently smooth as not to provide a discontinuity in tangents to the surface of the nozzle 22 along the direction of flow.

It is noted that this smooth change of cross-section normal to the turbine axis at the leading edge 28 of the vanes 23 contrasts with many known vane assemblies which typically have a very sudden change of cross-section normal to the turbine axis as the flow in the annular duct is partitioned into the nozzles. This smooth change of cross-section at the leading edge 28 of the vanes 23 assists in control of the secondary flows.

Figure 8:
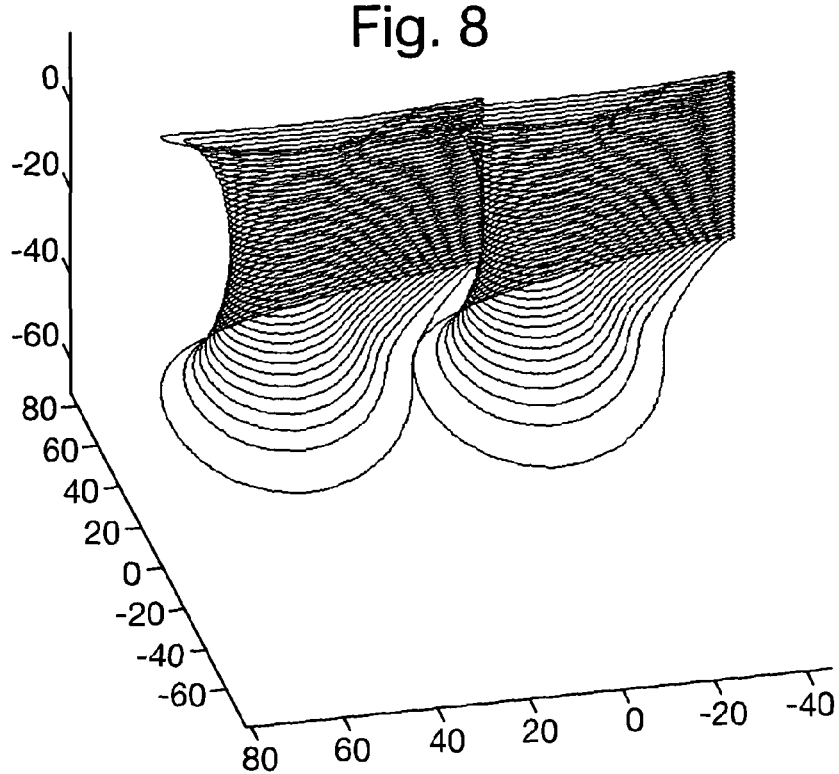
FIG. 8 is a diagram of contours of the nozzle of FIGS. 2 and 3 in planes of constant non-dimensional height measured radially from the turbine axis.

FIG. 8 illustrates the shape of the leading edge 28 of the nozzle 22 along the turbine axis by showing contours in planes of constant non-dimensional height radially from the turbine axis (or constant non-dimensional height, that is at constant values of (r−R1)/(R2−R1), where R1 and R2 are the local minimum and maximum radii of the nozzle and r is the local radius of the contour).

Instead of all the nozzles 22 having the smoothly changing cross-section described above, but the vane assembly 21 may be modified so that only some of the nozzles 22 have the smoothly changing cross-section. This reduces the overall benefit of changing the shape of the nozzles, but may be desirable for another reason.

By way of example, some of the vanes 23 may be replaced by larger vanes in order to act as supportive struts, the replaced vanes 23 being preferably evenly spaced. In this case, typically less than one in three of the vanes 23 are replaced. Where vanes 23 are so replaced, the nozzles 22 adjacent to a replaced vane 23 may still have the smoothly changing cross-section or may have a different cross-section to facilitate the provision of support.

Figure 10:
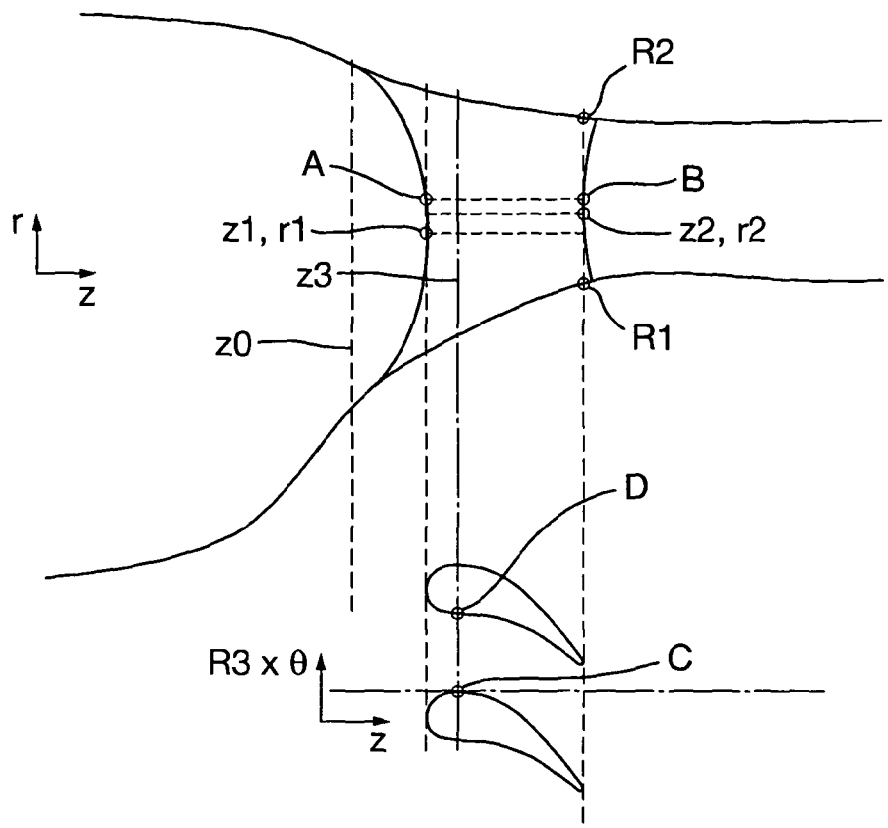
FIG. 10 is a schematic side view of a vane taken along the turbine axis, with an inset that is a schematic cross-section of two vanes in an unwrapped plane of constant radius.
Figure 11:
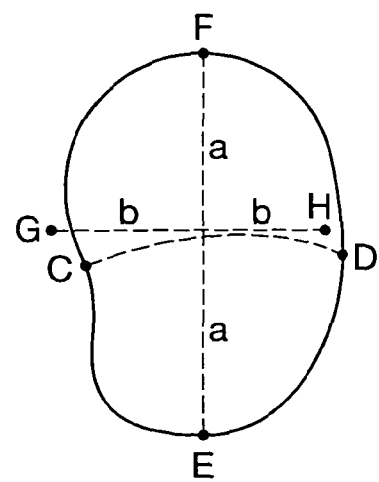
FIG. 11 is a schematic cross-sectional view normal to the turbine axis of a nozzle in plane of FIG. 10.

The definition of the limit L will now be described in terms of characteristic lengths a and b of the nozzle 22, making reference to FIGS. 10 and 11 to illustrate geometric features of the vane assembly 21. In particular, FIG. 10 is a schematic side view of a vane taken along the turbine axis, with an inset that is a schematic cross-section of two vanes in an unwrapped plane of constant radius from the turbine axis.

A polar co-ordinate system is defined in which:
z is the axial direction and increases in the direction of flow, the zero point being taken at the exit of the last compressor stage, upstream of the high pressure vane;
r is the radial distance measured from the turbine axis; and
$\theta$ is an angular co-ordinate measured positive anticlockwise from top-dead-centre when the machine is viewed from upstream to downstream.

In this co-ordinate system, the location of the saddle point 29 may be defined by (z1, r1, $\theta$1), being a position where a circle centred on the turbine axis in a plane normal to the turbine axis and touching the leading edge of a vane 23 maximises the position z along the turbine axis.

There is similarly defined a reference plane normal to the turbine axis at a position where a circle in the reference plane centred on the turbine axis and touching the trailing edge of a vane 23 minimises the position z along the turbine axis. The location where the circle touches the trailing edge may be defined by (z2, r2, $\theta$2) and a chord c may defined as (z2-z1), being a characteristic length of the vane 23 parallel to the turbine axis.

Using the reference plane, there is defined a reference radius r3 that is the average of (a) the minimum radius R1 from the turbine axis of the nozzle 22 at the inner hub 26 in the reference plane and (b) the maximum radius R2 from the turbine axis of the nozzle 22 at the outer casing 27 in the reference plane. AB is a cylindrical surface of the reference radius R3.

Using the reference radius r3, there is defined a reference cross-section of a nozzle 22 normal to the turbine axis at a position along the turbine axis where an axial line parallel to the turbine axis the reference radius r3 from the turbine axis is tangential to the suction surface 24 of a vane 22, as shown in the inset of FIG. 10, i.e. at a point C on the cylindrical surface AB. The reference cross-section is at a position z3 along the turbine axis. D is the corresponding point on the pressure surface 25 of the nozzle in the reference cross-section at the reference radius r3 and at position z3 along the turbine axis. A schematic view of the exemplary reference cross-section is shown in FIG. 11 including the points C and D.

Two characteristic lengths a and b are defined using the reference cross-section.

The characteristic length a is defined as half the difference between (c) the minimum radius from the turbine axis of the nozzle at the inner hub in the reference cross-section at point E and (d) the maximum radius from the turbine axis of the nozzle at the outer casing in the reference cross-section at point F. This characteristic length a is characteristic of half the radial height of the nozzle 22 between the inner hub 26 and outer casing 27 in the reference cross-section.

The characteristic length b is defined as the area of the reference cross-section divided by the product ($\pi$.a). This characteristic length b is characteristic of the width of the nozzle 22 between the vanes 23 in the reference cross-section. This can be understood noting that the area A of an ellipse of major and minor radii a and b would be equal to the product ($\pi$.a.b). Thus the characteristic length b is equal to the radius perpendicular to the line EF in the case that the reference cross-section is an ellipse, and is characteristic of the radius perpendicular to the line EF in the case that the reference cross-section has a different shape. By way of example for the reference cross-section shown in FIG. 11, there is drawn a line GH of length $2b$ perpendicular to the line EF and passing through the midpoint of the line EF.

Using the characteristic lengths a and b, the limit L is defined as k.min(a,b), where k is a constant of at least ⅓, more preferably at least ½, more preferably still at least ⅔.

The vane assembly 21 provides advantages over conventional designs as will now be discussed. The secondary flow structure of the vane assembly 21 is very different from that of prior art designs including a nozzle of two-dimensional shape that is predominantly a sector. This makes it possible to optimise the secondary flows to improve the aerodynamic loss and cooling performance.

Surface flow field and the implications for film cooling design will first be considered.

Figure 13:
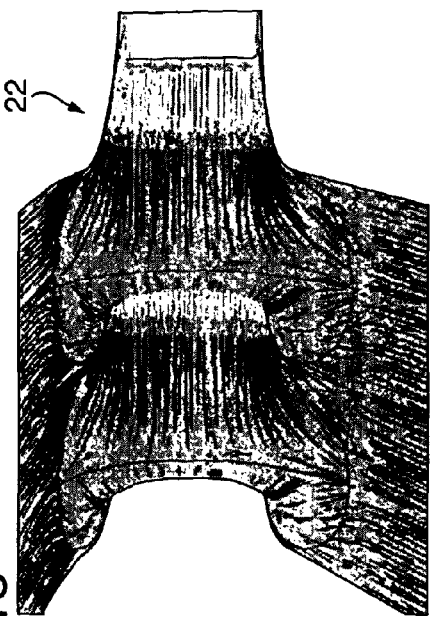
FIGS. 12 and 13 show the surface flow pattern for a conventional nozzle and modified nozzle, respectively, in a linear cascade environment.
Figure 12:
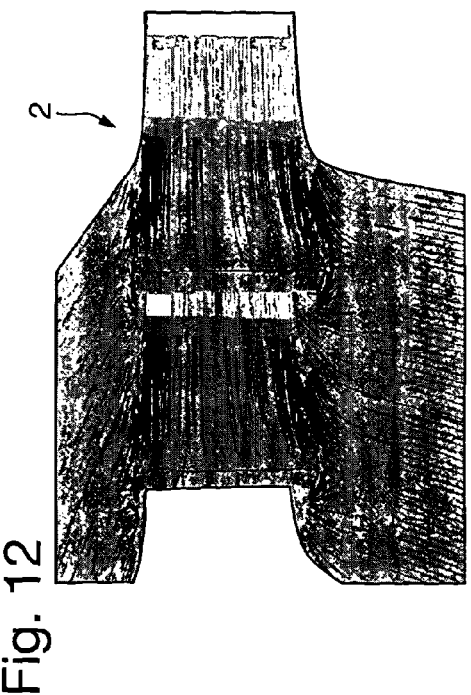

Embodiments of the vane assembly 21 have been investigated with computational fluid dynamics to understand the surface flow pattern. Seeded particles on the wall surfaces were used to gain an insight into the 3D flow field. FIGS. 12 and 13 show the surface flow pattern for a conventional nozzle 2 and the modified nozzle 22, respectively, in a first embodiment tested in a linear cascade environment.

For the conventional nozzle 2, the stagnation region at the leading edge and the corner streamlines associated with the beginnings of the horseshoe vortex can be seen. The horseshoe vortex structure is well known in both linear and annular cascades. The horseshoe vortex region is characterized by a high degree of mixing of the boundary layer fluid and mainstream fluid and is, because of this, difficult to film cool. It is clear that in FIG. 13, the horseshoe vortex structure is substantially altered and, indeed, eliminated in the near-leading-edge region due to the acceleration over the blended endwall region upstream of the conventional location of the nozzle leading edge. It is expected that this will be of particular advantage in film cooling the nozzle.

Figure 15:
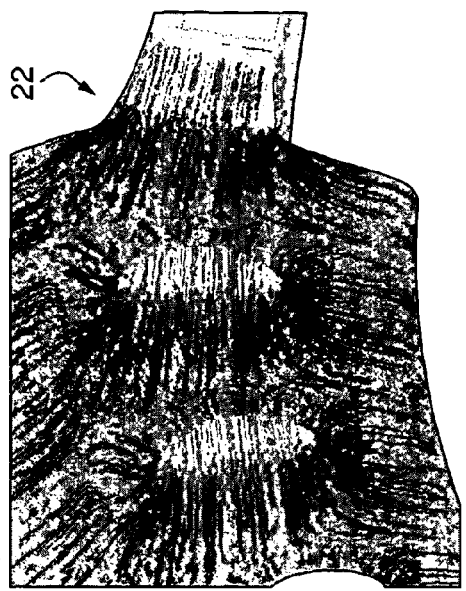
FIGS. 14 and 15 show the surface flow pattern for a conventional nozzle and modified nozzle, respectively, in an annular cascade environment.
Figure 14:
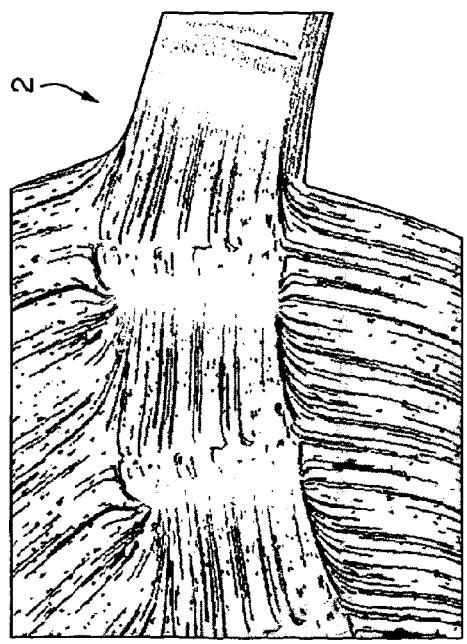

FIGS. 14 and 15 show the surface flow pattern for a conventional nozzle 2 and the modified nozzle 22, respectively, in a second embodiment tested in an annular cascade environment. It is clear that in the annular environment (which is the situation in the engine) the flow pattern is substantially altered particularly in the leading edge region. The modification to the horseshoe vortex structure, which is weakened and develops further aft in the nozzle, is likely beneficial for film cooling design.

Aerodynamic performance will next be considered.

The typical conventional nozzle 2 and the modified nozzle 22 modified according to the present invention shown in FIGS. 14 and 15 were tested to assess the aerodynamic performance in terms of surface Mach number distribution and exit whirl angle. Results from a CFD study of the surface Mach number distribution for the conventional nozzle 2 are shown in FIG. 16. In this figure, the CFD predictions are shown at a number of exit Mach numbers and the experimental data are shown at a single exit Mach number close to the design point. Both experiment and CFD are for the geometry shown in FIG. 14. The solid line in FIG. 16 shows the midspan isentropic Mach number on the nozzle surface for the reference case at design conditions alongside experimental data (+). In general, the computational results agree well with the experimental data and lies within the error range of the experiment. Divergences on the suction side between 80% and 100% axial chord are to be expected as the experimental shockwave is unsteady and its position varies. Thus some spatial smoothing of the pressure distribution in the experiment in this region occurs in the time average data. This comparison gives confidence in the CFD method.

In FIG. 17 similar results are presented for the nozzle 22 modified according to FIG. 15. Experimental results for the conventional nozzle 2 are shown by (+) markers. CFD predictions for the modified nozzle 22 are shown for a number of exit Mach numbers at static to total pressure ratios which have the same value as for the solutions presented in FIG. 16. It is clear that there is a high degree of similarity between the isentropic Mach number distributions for the conventional and modified vane at mid-span. That is to say, despite the significant modifications to the geometry which may lead to reductions in heat transfer and loss, and benefits in cooling system design, it has been demonstrated that the modified nozzle geometry can have an axial Mach number distribution similar to a conventional nozzle.

As a consequence of the similar axial Mach number distribution within the nozzle for a given operating pressure ratio, the exit whirl angle distribution is similar to a conventional nozzle 2 for the designs tested.

Secondary flow field and total pressure loss will now be considered.

To quantify the aerodynamic performance of the vane 23 in terms of the secondary flow at exit, and the total pressure loss of the vane, CFD predictions were performed on the conventional nozzle 2 and modified nozzle 22 shown in FIGS. 12 and 13. Contours of vorticity magnitude are shown in FIG. 18 at 10% axial chord downstream of the nozzle for the conventional nozzle 2 (top) and the modified nozzle 22 (bottom). It is clear that in terms of the secondary kinetic energy at exit (quantified by the vorticity magnitude) the two nozzles 2 and 22 perform similarly. Quantitatively the modified nozzle 22 performed slightly better and it is expected that by investigating the design space surrounding the modified nozzle 22 a design with better performance could be developed.

Figure 19:
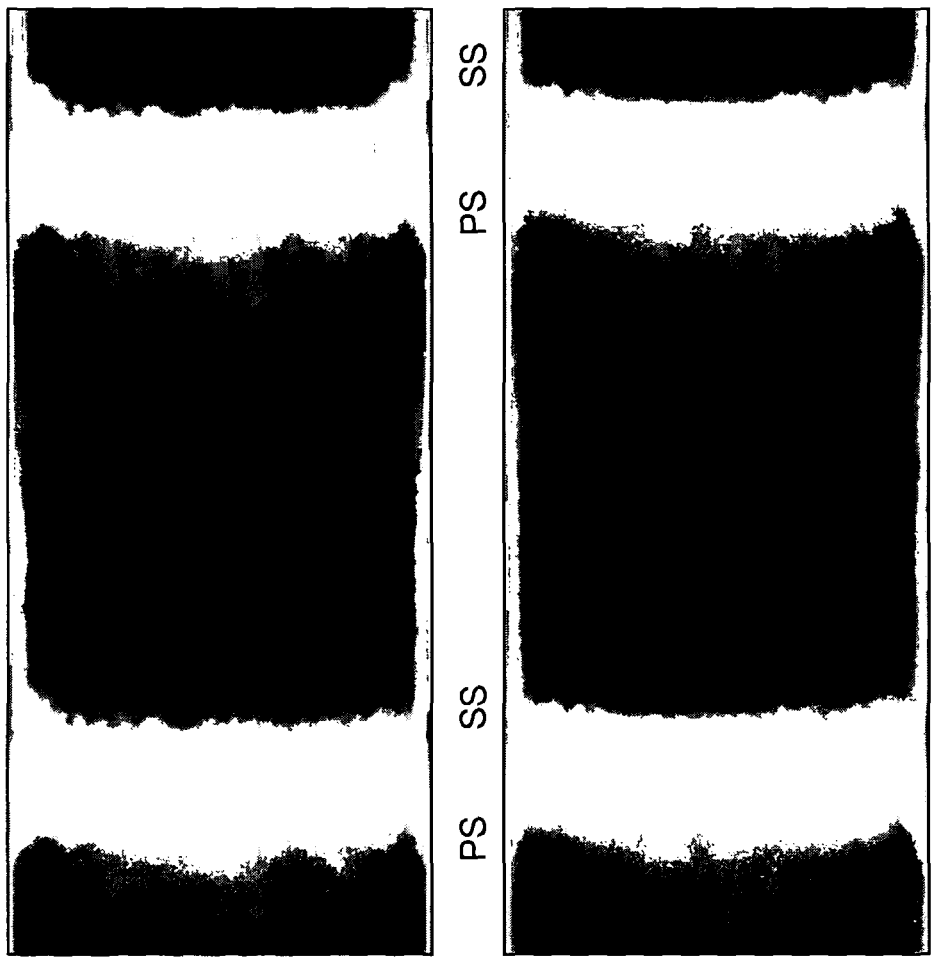
FIG. 19 is a plot of contours of total pressure loss coefficient ($C_p$) for a 10% axial chord downstream of the nozzle trailing edge for the nozzles of FIGS. 12 and 13.

Contours of total pressure loss coefficient $C_p$ are shown in FIG. 19 at 10% axial chord downstream of the nozzle for the conventional nozzle 2 (top) and the modified nozzle 22 (bottom). The two nozzles 2 and 22 perform similarly. Further investigations have shown that total pressure loss improvements of up to 10% (of the total pressure loss) are possible using designs in the same family as the modified nozzle 22 shown in FIG. 13. Here total pressure loss coefficient is defined by the equation:

$$C_p = \frac{p_{01} - p_{02}}{p_{02} - p_2}$$

where $p_{01}$ is the inlet total pressure to the nozzle, $p_{02}$ is the mass averaged exit total pressure, and $p_2$ is the mass averaged exit static pressure.

Figure 20:
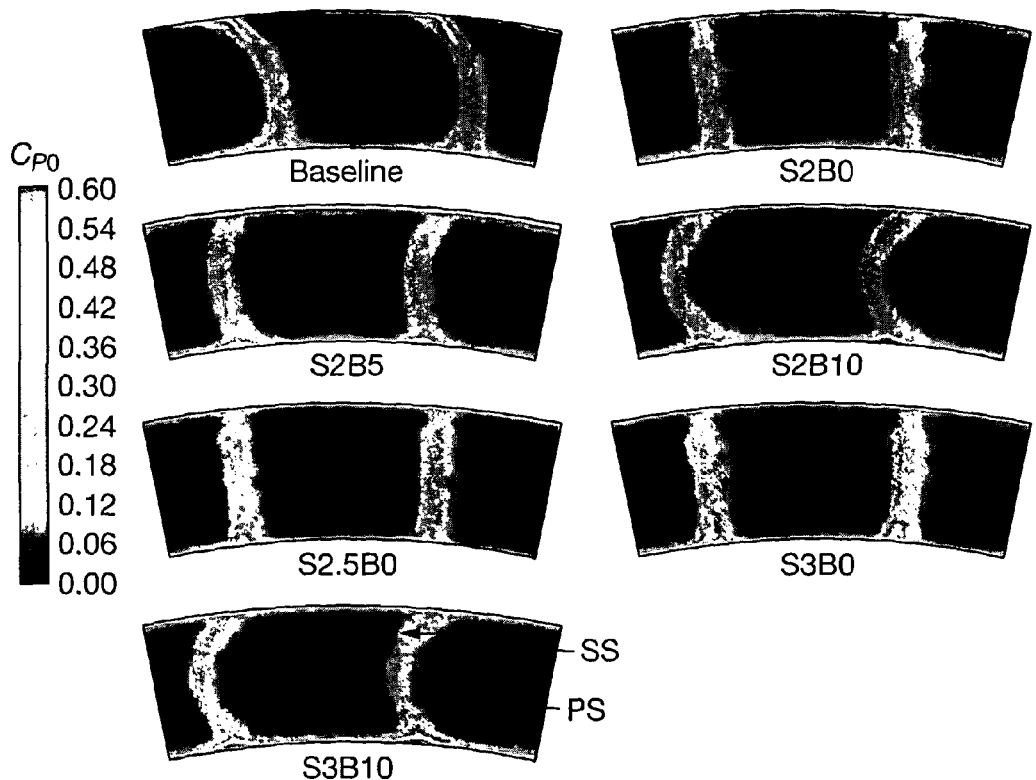
FIG. 20 is a plot of contours of total pressure loss coefficient ($C_p$) 10% axial chord downstream of the nozzle trailing edge for the nozzles of FIGS. 14 and 15.

Annular geometries have been subject to the same analysis as presented above and FIG. 20 shows results for a conventional nozzle 2 (top left) shown in FIG. 14 and a family of nozzles related to the modified nozzle 22 (others except top left) shown in FIG. 15, presented in terms of total pressure loss coefficient. The mass averaged total pressure coefficient for vanes of the family of the modified vane shown in FIG. 15 show reductions in total pressure loss coefficient of up to 10% compared with the conventional vane shown in FIG. 14.

Figure 21:
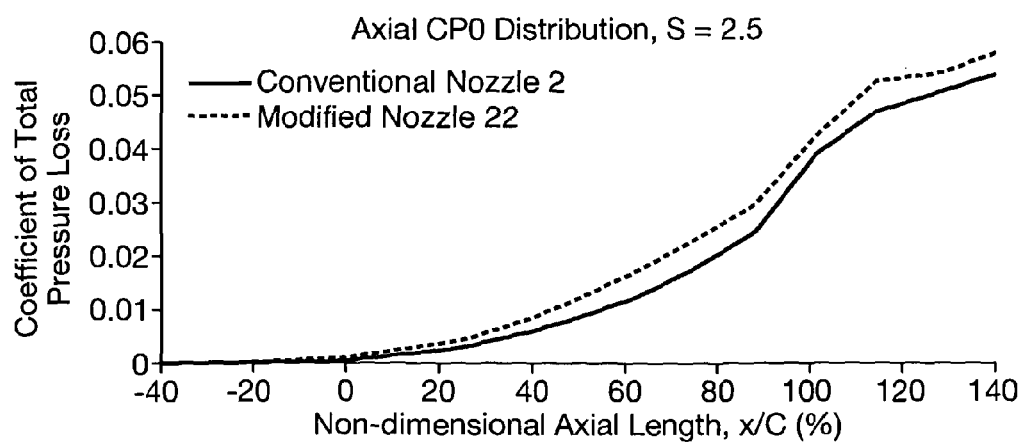
FIG. 21 is a graph of the total pressure loss coefficient ($C_p$)) as a function of axial distance for the nozzles of FIGS. 14 and 15.

This result is also illustrated by comparing the axial development of mass averaged total pressure loss coefficient for the conventional nozzle 2 and the modified nozzle 22 (bottom), as shown in FIG. 21. The modified nozzle 22 outperforms the conventional nozzle 2 by approximately 10%. Thus a significant improvement in aerodynamic performance by using the novel vane shape over conventional shapes is demonstrated.

Heat transfer will now be considered.

Figure 22:
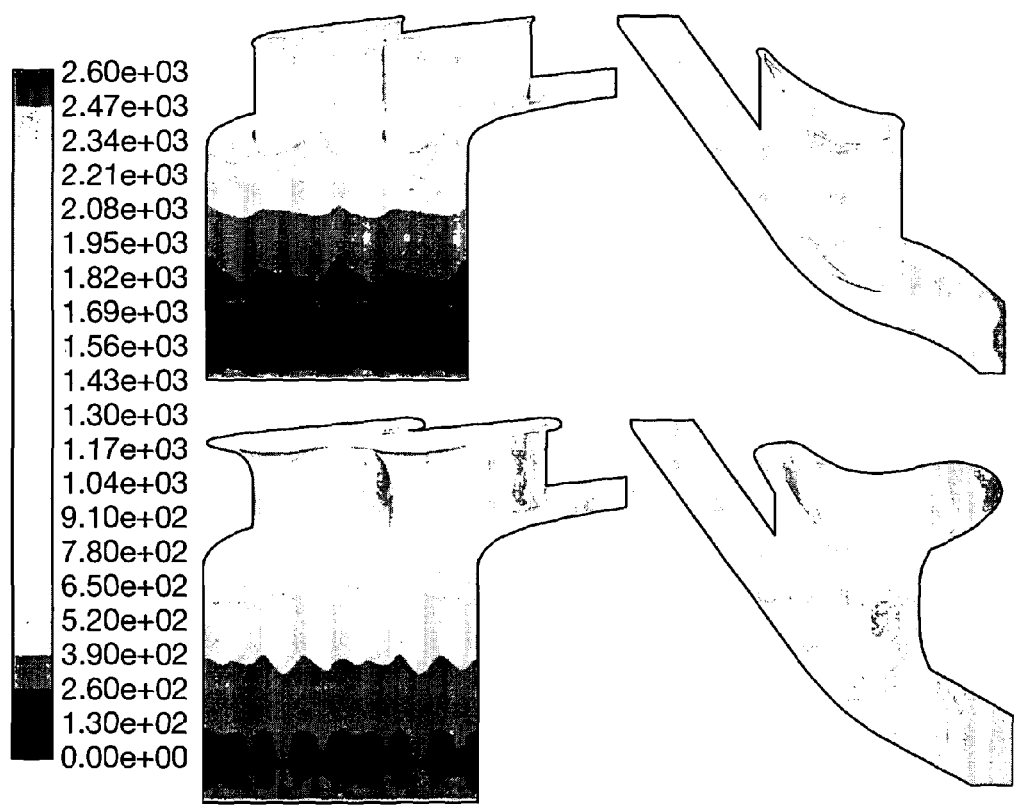
FIG. 22 is a plot of contours of surface heat transfer coefficient for the nozzles of FIGS. 12 and 13.
Figure 23:
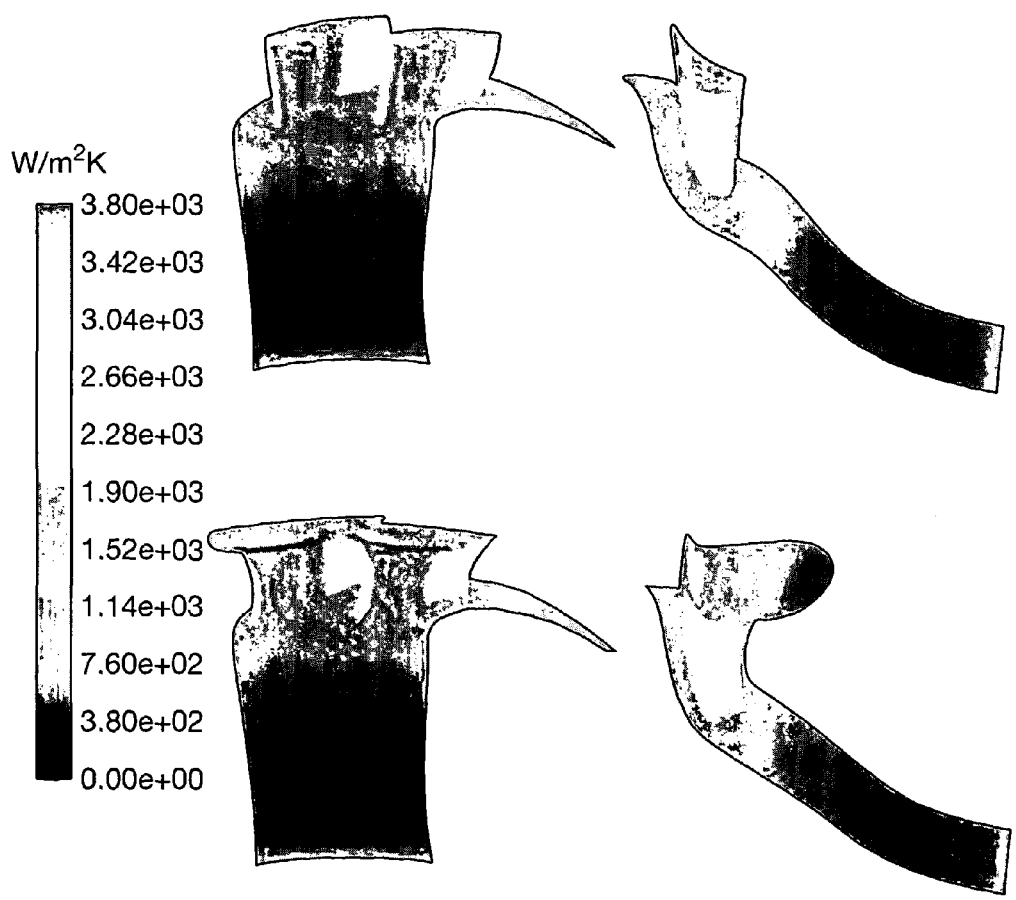
FIG. 23 is a plot of contours of surface heat transfer coefficient for the nozzles of FIGS. 14 and 15.

FIG. 22 shows contours of heat transfer coefficient for the conventional nozzle 2 and modified nozzle 22 of FIGS. 12 and 13. FIG. 23 shows similar results for the annular nozzle 2 and modified nozzle 22 of FIGS. 14 and 15. In both the linear case (FIG. 22) and the annular case (FIG. 23), improvements in area averaged heat transfer coefficient of order 5% were seen. The change from the conventional to the modified geometry has an associated decrease in area of several percent. Thus a reduction in overall heat load of greater than 5% can be expected with the modified design.

Contours of heat transfer coefficient suggest the reduction in area averaged heat transfer coefficient comes partly from a reduction in heat transfer coefficient on the late suction side of the nozzle. This area is particularly difficult to cool on account of the high cost of injecting in high Mach number flow, and the consequent requirement to inject significant cooling flow in the leading edge region so that adequate films are established on the late suction side. A reduction in heat transfer coefficient in this region could lead to a significant improvement in the overall cooling system design.

There is a particular improvement in the heat transfer coefficient at the suction side/end-wall corner just downstream the leading edge. This is associated with the modification of the suction side leg of the horseshoe vortex which entrains hot flow from the in the case of the conventional vane. It is also noted that there is a reduced stagnation region in the case of the modified nozzle 22. Unlike the conventional vane 3, cooler endwall boundary layer fluid is swept up onto the extended front surface of the modified geometry. This is likely to lower the cost of cooling the vane in the engine situation.

In summary it has been demonstrated that the modified nozzle 22 allows for a significant reduction in overall heat load caused by reductions in both surface averaged heat transfer coefficient and surface area. There is also a potential for reduction in the peak heat transfer coefficient and peak heat load. These factors allow room for cooling schemes with lower overall cooling air requirement, and therefore the potential for higher overall engine performance.

The design of the nozzles 22 may also provide a potential improvement in manufacturability of combined cooling systems as discussed further below.

The vane assembly 21 described above may be used is a variety of axial flow turbines.

The vane assembly 21 can provide the advantages discussed above when applied to a gas turbine in which the working fluid is a gas, usually the combustion products of fuel combusting in air, for example in an aero engine or a static (or land-based) gas turbine engine.

Figure 24:
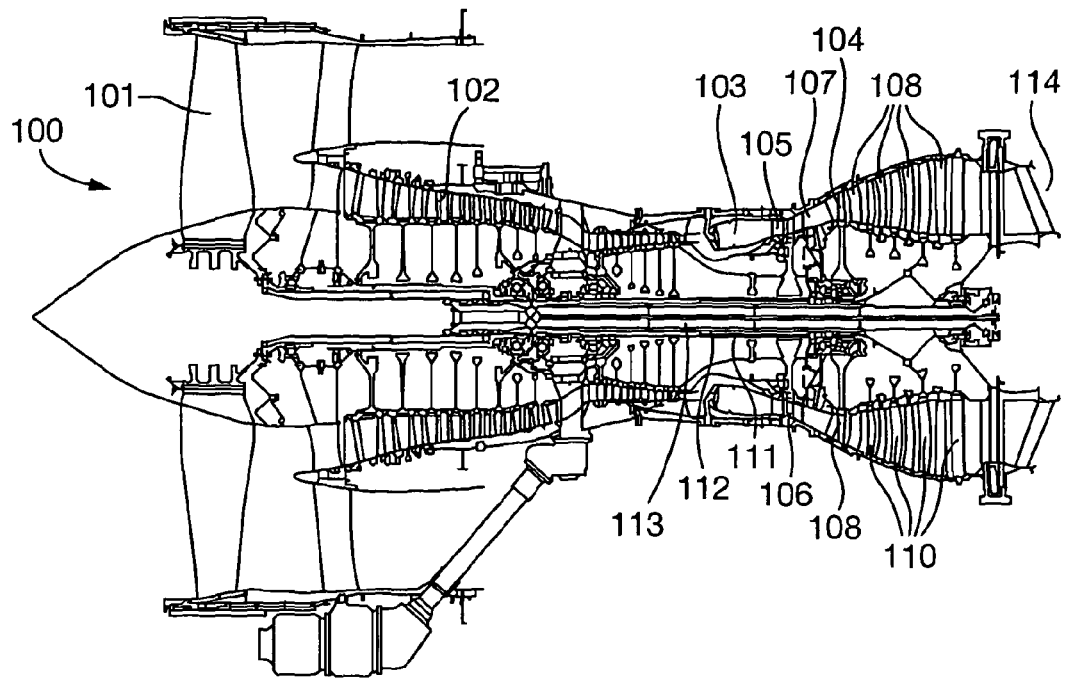
FIG. 24 is a cross-sectional view of a high bypass aero engine.

FIG. 24 shows an example of an aero engine 100 in which the vane assembly 21 may be applied. The aero engine 100 comprises the following sections arranged symmetrically around the turbine axis T.

An intake section 101 feeds air into a compression section 102 that compresses the air. The compression section 102 feeds the compressed air into a combustion section 103 in which combustion of the fuel occurs.

The combustion products are fed from the combustion section 103 into a turbine 104, that comprises an HP (high pressure) stage consisting of an HP stator 105 and an HP rotor 106; an IP (intermediate pressure) stage consisting of an IP stator 107 and an IP rotor 108; and an LP (high pressure) stage consisting of an LP stator 109 and an LP rotor 110.

Within each respective stage, the HP stator 105, the IP stator 107 and the LP stator 109 are each a vane assembly that receives, accelerates and turns the axially flowing gas before feeding into the HP rotor 106, the IP rotor 108 and the LP rotor 110 that are connected to a respective axial shafts 111, 112 and 113 that are themselves connected to the compression section 102. Within each respective stage, the HP rotor 106, the IP rotor 108 and the LP rotor 110 are driven to rotate by the received axially flowing gas. This drives rotation of the axial shafts 111, 112 and 113 which in turn drives the compression section 102.

The axially flowing gas leaving the LP rotor 113 is exhausted through an exhaust section 114.

The vane assembly 21 may be applied as any or all of the HP stator 105, the IP stator 107 and the LP stator 109 and/or in any of all of the HP rotor 106, the IP rotor 108 and the LP rotor 110. However, the advantages are most significant when applied to stages of higher pressure. Thus, the vane assembly 21 is most advantageously applied to the HP stator 105 and/or HP rotor 106 of the HP stage and to a lesser extent to the IP stator 107 and/or LP rotor 108 of the IP stage. In a given engine, it might be that the vane assembly 21 is not applied to the LP stator 105 and/or LP rotor 106 of the LP stage. In each case, however, the vane assembly 21 is applied in a situation where the plurality of nozzles 22 are arranged to partition a flow from an annular duct.

Figure 25:
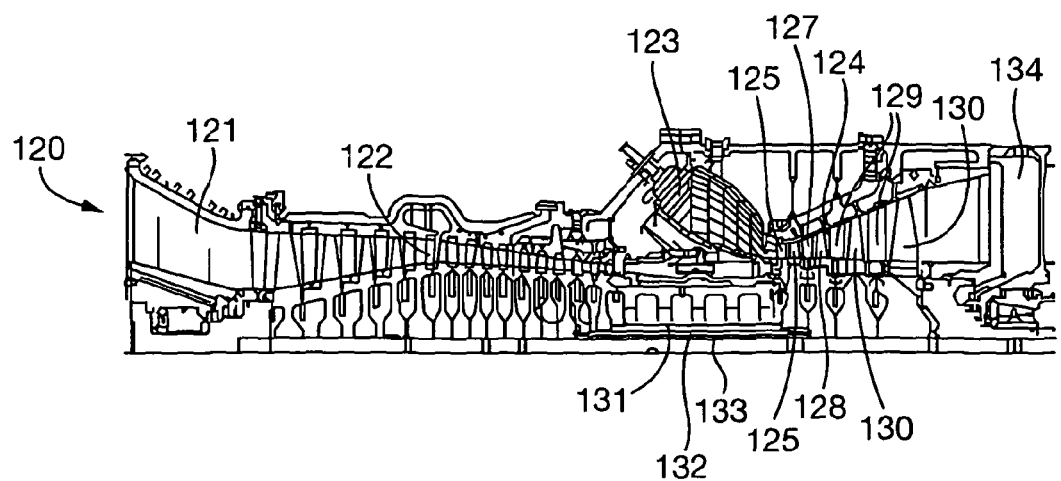
FIG. 25 is a cross-sectional view of a land based gas turbine engine.

Similarly, FIG. 25 shows an example of a static gas turbine engine 120 in which the vane assembly 21 may be applied. The static gas turbine engine 120 comprises the following sections arranged symmetrically around the turbine axis T: intake section 121; compression section 122; a combustion section 123; a turbine 124 comprising an HP (high pressure) stage consisting of an HP stator 125 and an HP rotor 126, an W (intermediate pressure) stage consisting of an IP stator 127 and an IP rotor 128, and an LP (high pressure) stage consisting of an LP stator 129 and an LP rotor 130; axial shafts 131, 132 and 133; and an exhaust section 134. These components are arranged and operate in the same manner as the correspondingly named components of the aero engine 100 as described above.

The vane assembly 21 can also provide advantages when applied to a steam turbine in which the working fluid is steam. In this case, it is expected that similar advantages to those discussed above relating to improvement of the aerodynamic loss, although the advantages discussed above relating to improvement of heat transfer and cooling performance may be of less significance.

Figure 26:
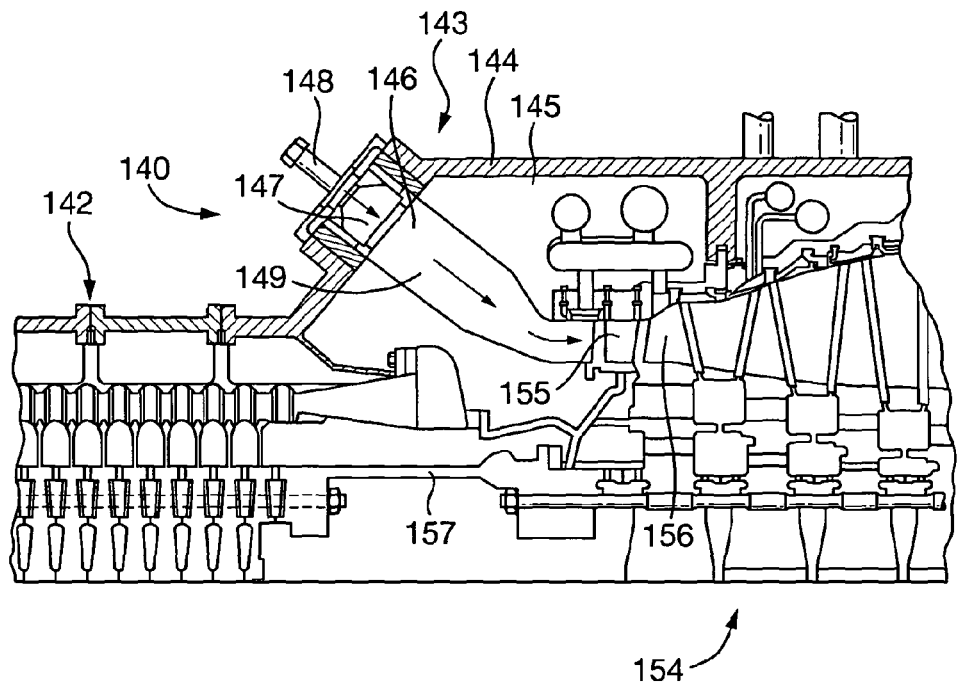
FIG. 26 is a partial cross-sectional view of an industrial gas turbine engine.

FIG. 26 shows an example of an industrial gas turbine engine 140 in which the vane assembly 21. The industrial gas turbine 140 is similar to that disclosed in U.S. Pat. No. 5,829, 245 containing a fuller description to which reference is made. The industrial gas turbine engine 140 comprises the following sections arranged symmetrically around the turbine axis T.

An intake section (not shown) feeds air into a compression section 142 that compresses the air. The compression section 142 feeds the compressed air into a combustion section 143 that combusts the fuel with the compressed air and feeds the combustion products to a turbine 154.

Figure 27:
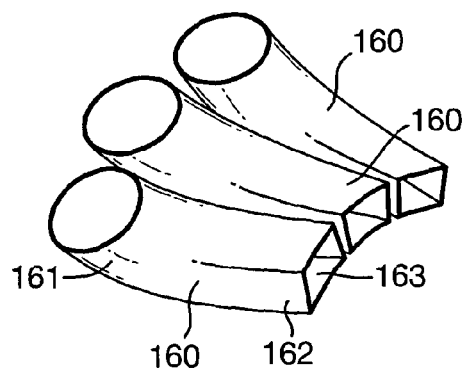
FIG. 27 is a perspective view of three combustion cans of conventional construction.
Figure 28:
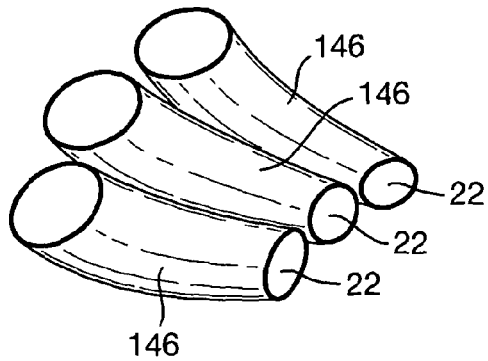
FIG. 28 is a perspective view of three combustion cans of the industrial gas turbine engine of FIG. 26.

The combustion section 143 comprises a shell 144 that encloses a cavity 145. The shell 144 mounts a plurality of discrete combustion cans 146 in an array around a circumference of the combustion section 143. Each combustion can 146 comprises a head end 147 that receives fuel from a fuel inlet 148, and a combustion chamber 149. Each nozzle of the vane assembly of the stator 155 is formed as the continuation of a combustion can 146 such that the need for an annular region in which the flow from the combustion cans 146 is collected is avoided. In the situation, the number of nozzles is equal to the number of combustion cans 146. The vane assembly 21 may be applied to the stator 155 in which case the combustion cans 146 each have a cross-section that varies smoothly into the cross-section of the nozzles 22. As the combustion cans 146 may be arranged transverse to the turbine axis T, along the combustion cans 146 up to the front end of the nozzles 22, the relevant cross-section is taken perpendicular to a central axis of the combustion cans 146. The change in cross-section from the combustion cans 146 to the nozzles 22 is sufficiently smooth as to optimise, or not to disrupt, the flow of working fluid into the nozzle 22. For example, in some embodiments the change is sufficiently smooth as not to provide a discontinuity in the second derivative of the cross-sectional area with position and/or in some embodiments the change is sufficiently smooth as not to provide a discontinuity in tangents to the surface of the combustion can 146 and nozzle 22 along the direction of flow. Due to the shape of the nozzle 22, it is not essential to form the combustion can 146 with a conventional construction as shown in FIG. 27 in which a combustion chamber 160 comprises a cylindrical or cone shaped metal liner 161 engaging the round head end and a sheet metal transition piece 162 that transitions the hot gas flow-path from the round cross section of the liner 161 to an arc-shaped sector of the inlet 163 to the turbine. As shown in FIG. 28, in the combustion can 146, the transition piece 162 is avoided by allowing the flow to transition directly from the circular or oval shape of the combustion can 146 into the first shape of the nozzle 22. Thus, the leading edge of the vanes 23 is eliminated altogether and each nozzle 22 becomes a natural extension of a combustion can 146.

Where the number of vanes 23 is greater than the number of combustion cans 146 and where there is an integer count ratio (i.e. no. vanes/no. combustion cans=integer), the combustion cans 146 transition into a kidney shaped sector where the R-hand extreme and L-hand extreme of each sector form half of the first shapes of the vanes 23 on the extreme R and L of the sector eliminating the leading edges of these vanes 23. Thus the combustion cans 146 would blend smoothly with the first shape of the vane 23 without the need to transition to "square cornered" sector. The intermediate vanes 23 are formed as described elsewhere in this specification. Thus the nozzle surfaces blend smoothly with the upstream combustion can 146. This allows better secondary flow control and eliminates the need to cool the leading edges of the vanes 23 which are eliminated by co-joining the nozzles with the combustion can 146.

In other embodiments, the inlet 152 may be replaced by an annular duct that collects the flow from the multiple discrete combustion cans 146 downstream of the exhausts from the transition pieces 151. In this case the vane assembly 21 may be applied to either or both of the stator 155 and rotor 156.

The turbine 154 may alternatively have multiple stages in which case the vane assembly 21 may also be applied to subsequent stages, as in the aero engine 100 and the static gas turbine engine 120 described above. Although the industrial gas turbine 140 is a static engine, the vane assembly may similarly be applied to an aero-engine gas turbine that employs a plurality of discrete combustion cans.

The manufacture of the vane assembly may be performed simply by applying conventional techniques to the modified shape of the nozzle.

For example, the vane assembly 21 may be manufactured by investment casting (sometimes referred to as wax casting). The vane assembly 21 may be cast as an integral piece including the vanes 23, the inner hub 26 and the outer casing 27.

Alternatively, the vane assembly 21 may be formed in pieces and subsequently welded together. For example, the investment casting method may be used in conjunction with a process of welding the vanes 23 to the inner hub 26 and to the outer casing 27. In this case, the vanes 23 defining the front ends of the nozzles 22 may be cast using the investment casting method described above. The vanes 23 may then be welded to the inner hub 6 and to the outer casing 27.

The outer casing 27 may be manufactured in a separate process from the inner hub 26 and the vanes 23. In particular, the outer casing 27 may be produced by a forging process. The forging process involves using compression forces to form the shape of the outer casing 27 from a material such as steel.

The investment cast method is described as follows. A mould of the desired part is produced. As explained above, the desired part may be the whole vane assembly 21, or a part of the vane assembly 21 such as the vanes 23 if the vanes are to be subsequently attached to the inner hub 6 and to the outer casing 27. The mould may be made from a metal that has a relatively low melting point, steel, or wood, for example.

The mould may be produced from a master pattern. The master pattern is a modified replica of the desired part. The master pattern may be made from a metal, wood, or plastic, for example. The material of the master pattern should be malleable. Alternatively, the mould may be machined directly. In this case, the step of producing the master pattern may be omitted.

A "wax" pattern is produced. The so-called "wax" pattern may be made from wax, plastic, or frozen mercury, for example. The "wax" pattern may be produced by forming an even coating of wax pattern material on the inner surface of the mould. The coating may have a thickness of about 3 mm. The coating may be formed by pouring the wax pattern material into the mould to cover the inner surface of the mould. This pouring step may be repeated until the desired coating thickness is reached. This pouring method has the advantage that the thickness of the coating can be accurately controlled.

Alternatively, the coating may be formed by filling the mould with the wax pattern material in liquid form. The wax pattern material is then left to cool until the coating has set on the inner surface of the mould. The remainder of the unset wax pattern material is poured out of the mould.

The "wax" pattern is removed from the mould. Multiple different "wax" patterns, each corresponding to a different component part of the vane assembly 21 may be produced and subsequently assembled to form a single complex "wax" pattern. For example, a "wax" pattern may be produced for each nozzle 22 or for each vane 23 of the vane assembly 21. Alternatively a wax pattern may be produced for a subset of the nozzles 22 or vanes 23 of the vane assembly 21.

The plurality of "wax" patterns may be attached to each other directly to form the complex wax pattern of the desired part (e.g. the whole vane assembly 21) by using a heated metal tool. Alternatively, the individual "wax" patterns may be attached to a sprue by using a heated metal tool to form the complex "wax" pattern. A heated metal tool may be used to at least reduce the imperfections produced at the joins between the individual "wax" patterns.

The investment mould, which may be made of ceramic material, is produced. The completed "wax" pattern is coated with a slurry of fine refractory material. Subsequently, the "wax" pattern is stuccoed with coarse particles, such as ceramic particles. This may be done by dipping the "wax" pattern into a fluidised bed of ceramic particles, or by applying the ceramic particles by hand, for example. The coating is allowed to harden. The steps of coating, stuccoing and hardening are repeated until the investment mould has the required thickness. The thickness of the mould may be within the range of from about 5 mm to about 15 mm.

The refractory material used to produce the investment mould may be silicon dioxide, zircon, an aluminium silicate, or aluminium oxide, for example. Different refractory materials may be used for different coatings of the investment mould. A substance such as ethyl silicate, colloidal silica, or a sodium silicate may be used to bind the refractory material in place.

The investment mould is then left to dry. A vacuum may be applied to reduce the drying time. The investment mould is then placed in a furnace or autoclave to melt out and/or vaporise the wax pattern material.

The investment mould is then heated to a temperature within the range of from about 900° C. to about 1100° C. The purpose of this is to remove any moisture and residual wax pattern material, and to sinter the investment mould.

The investment mould is then placed into a container that is filled with sand, or a sand-like material. The metal that is used to form the desired part (e.g. the vane assembly 21) is filled into the investment mould. This may be done by any of a combination of pouring, applying positive air pressure, tilt filling, and centrifugal casting.

The investment mould is removed to release the vane assembly 21. If a sprue was used, then the sprue is cut off and may be recycled. The vane assembly 21 may be cleaned, for example by a grinding process.

As mentioned above, one of the advantages related to the shape of the vane assembly 21 is that the ability to cool the vanes internally is improved. Some modern gas turbine nozzles operate at very high mainstream gas temperature and are cooled with a combination of film cooling, and internal cooling with combined rib/pin and impingement cooling systems. An internal cooling system may comprise an impingement cooling inserts disposed within the cavity of the nozzle 2. The purpose of the impingement cooling insert is to augment heat transfer coefficients on the inner surface of the nozzle 22. The nozzle 22 must be shaped so that there is access for the insertion of an impingement cooling insert. The modified vane assembly 21 has improved access to the internal surfaces of the nozzles 22. The improved access reduces the constraints on the design of the impingement cooling insert of the internal cooling system. This allows highly optimized internal cooling systems to be implemented in conjunction with the vane assembly 21. In particular the improved access will allow more flexibility in the development of impingement cooling systems within the vane. Also, it is possible to perform machining operations on a larger proportion of the inner surface of the nozzles 22. This allows an internal cooling system to be formed by machining, in addition to the conventional casting techniques, again reducing the constraints of any internal cooling system.

The invention claimed is:

1. A vane assembly for an axial flow turbine, the vane assembly providing a plurality of nozzles arranged symmetrically around a turbine axis formed by an inner hub, an outer casing and vanes intermediate pairs of adjacent nozzles, the vanes providing a suction surface of one of the pair of adjacent nozzles and a pressure surface of the other of the pair of adjacent nozzles, at least some of the nozzles having a cross-section normal to the turbine axis that changes smoothly with the position of the cross-section along the turbine axis from a first shape at an upstream end of the nozzle, the first shape having a minimum radius of curvature of a first value that is no less than a limit L, to a second shape at a downstream end of the nozzle, the second shape having a minimum radius of curvature of a second value less than the first value, where defining a reference plane normal to the turbine axis, which reference plane contains a circle that is centred on the turbine axis and touches the trailing edge of a vane at the most upstream position possible along the turbine axis in the direction of axial flow, defining a reference radius from the turbine axis that is the average of (a) the minimum radius from the turbine axis of the nozzle at the inner hub in the reference plane and (b) the maximum radius from the turbine axis of the nozzle at the outer casing in the reference plane, defining a reference cross-section of a nozzle normal to the turbine axis at a position along the turbine axis where an axial line parallel to the turbine axis at the reference radius from the turbine axis is tangential to the suction surface of a vane, defining a characteristic length a as half the difference between (c) the minimum radius from the turbine axis of the nozzle at the inner hub in the reference cross-section and (d) the maximum radius from the turbine axis of the nozzle at the outer casing in the reference cross-section, and defining a characteristic length b as the area of the reference cross-section divided by the product ($\pi$.a), the limit L is defined as k.min(a,b), where k is a constant of at least $\frac{1}{3}$.

2. The vane assembly according to claim 1, where k is a constant of at least $\frac{1}{2}$.

3. The vane assembly according to claim 2, where k is a constant of at least $\frac{2}{3}$.

4. The vane assembly according to claim 1, wherein said first shape is one of: an ellipse; an oval; a racetrack shape having two straight sides between curved ends; or a curved shape having at least one inwardly curving section.

5. The vane assembly according to claim 1, wherein the second shape has four sides having a minimum radius of curvature of a value greater than the first value with corners between the four sides having a radius of curvature of a value less than the first value.

6. The vane assembly according to claim 1, wherein the second shape is one of: a sector; a filleted sector; a leant sector a filleted leant sector, a compound leant sector; a filleted compound leant sector.

7. The vane assembly according to claim 1, wherein said cross-section normal to the turbine axis changes smoothly from said first shape with a decreasing minimum radius of curvature to said second shape.

8. The vane assembly according to claim 1, wherein the plurality of nozzles are arranged to partition a flow from an annular duct, and the vanes intermediate two nozzles that have said cross-section that changes smoothly have a leading face facing into the annular duct is, said leading face being shaped as a saddle having a saddle point intermediate the inner hub and the outer casing.

9. The vane assembly according to claim 8, wherein the nozzles have said cross-section normal to the turbine axis of said first shape at the position along the turbine axis of the saddle point.

10. The vane assembly according to claim 8, wherein the leading face of a vane along a line in a plane extending radially of the turbine axis and through the saddle point, within a range of positions along the turbine axis from the saddle point of length b, is curved with a minimum radius of curvature that has a third value that is no less than said limit L.

11. The vane assembly according to claim 8, wherein the overall cross-section of the annular duct normal to the turbine axis bounded by the inner hub, the outer casing and the leading faces of the vanes varies smoothly with the position along the turbine axis within said range, and, at the position of the saddle point where the annular duct is divided into the plurality of nozzles, varies smoothly into the cross-sections of the plurality of ducts.

12. The vane assembly according to claim 1, wherein each nozzle is formed as the continuation of a combustion can, the combustion cans having a cross-section that varies smoothly into the cross-section of the nozzles.

13. The vane assembly according to claim 1, wherein the vane assembly is a stator or a rotor for a turbine stage of the axial flow turbine engine.

14. The vane assembly according to claim 13, wherein the turbine stage is a high-pressure turbine stage.

15. The vane assembly according to claim 13, wherein the turbine stage is an intermediate-pressure turbine stage.

16. The vane assembly according to claim 13, wherein the turbine stage is not a low-pressure turbine stage.

17. The vane assembly according to claim 1, wherein the axial flow turbine engine is an aero engine.

18. The vane assembly according to claim 1, wherein the axial flow turbine engine is a static turbine engine.

* * * * *